United States Patent
Sugita et al.

(10) Patent No.: US 8,803,791 B2
(45) Date of Patent: Aug. 12, 2014

(54) DISPLAY DEVICE

(75) Inventors: Yasuhiro Sugita, Osaka (JP); Kohei Tanaka, Osaka (JP); Hiromi Katoh, Osaka (JP); Christopher Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 309 days.

(21) Appl. No.: 13/511,957

(22) PCT Filed: Nov. 30, 2010

(86) PCT No.: PCT/JP2010/071327
§ 371 (c)(1),
(2), (4) Date: May 24, 2012

(87) PCT Pub. No.: WO2011/065558
PCT Pub. Date: Jun. 3, 2011

(65) Prior Publication Data
US 2012/0261557 A1  Oct. 18, 2012

(30) Foreign Application Priority Data

Nov. 30, 2009  (JP) .................. 2009-272671

(51) Int. Cl.
| | |
|---|---|
| G09G 3/36 | (2006.01) |
| G02F 1/1362 | (2006.01) |
| G06F 3/042 | (2006.01) |
| G06F 3/041 | (2006.01) |
| G02F 1/133 | (2006.01) |

(52) U.S. Cl.
CPC ...... G06F 3/0412 (2013.01); *G09G 2300/0426* (2013.01); G09G 3/3648 (2013.01); G02F 1/13624 (2013.01); G06F 3/042 (2013.01); *G02F 2001/13312* (2013.01); *G02F 2360/144* (2013.01)
USPC ........................................ 345/104; 250/208.1

(58) Field of Classification Search
CPC .............. G02F 1/13338; G02F 3/0488; G09G 2360/14–2360/148
USPC .......................... 250/208.1; 345/87, 207, 104
See application file for complete search history.

(56) References Cited

U.S. PATENT DOCUMENTS

2005/0248675 A1* 11/2005 Hashimoto et al. ........... 348/308
2010/0193804 A1  8/2010 Brown et al.

FOREIGN PATENT DOCUMENTS

| EP | 2 053 846 A1 | 4/2009 |
|---|---|---|
| JP | 63-160272 A | 7/1988 |
| JP | 2006-3857 | 1/2006 |
| WO | WO-2007/145346 | 12/2007 |
| WO | WO-2007/145347 | 12/2007 |
| WO | WO-2008/156023 | 12/2008 |

OTHER PUBLICATIONS

International Search Report mailed Jan. 11, 2011, directed to International Application No. PCT/JP2010/071327; 1 page.

* cited by examiner

*Primary Examiner* — Thanh Luu
*Assistant Examiner* — Renee D Chavez
(74) *Attorney, Agent, or Firm* — Keating & Bennett, LLP

(57) ABSTRACT

Provided is a display device that includes an optical sensor having a high sensitivity in which a potential difference of an accumulation node due to an illuminance difference on a light receiving surface after boosting is set greater than a potential difference of the same at an end of an integration period. The display device includes an optical sensor in a pixel region. The optical sensor includes a diode D1; a reset signal line RST for supplying a reset signal; a readout signal line RWS for supplying a readout signal; an accumulation node having a potential ($V_{INT}$) that varies with an amount of light received by the diode D1 during a period from supply of the reset signal to supply of the readout signal; an amplifying element C1 for amplifying $V_{INT}$ according to the readout signal; and a sensor switching element M2 for reading out the amplified potential and outputting the same to an output line. A potential of a light shielding film LS provided on a back side of the diode is fixed to a constant potential $V_{LS}$ satisfying the following formula: $V_{LS} \geq V_{RST.H}$.

17 Claims, 49 Drawing Sheets

DISPLAY DEVICE

REFERENCE TO RELATED APPLICATIONS

This application is a national stage application under 35 USC 371 of International Application No. PCT/JP2010/071327, filed Nov. 30, 2010, which claims priority from Japanese Patent Application No. 2009-272671, filed Nov. 30, 2009, the entire contents of which are incorporated herein by reference.

FIELD OF THE INVENTION

The present invention relates to a display device provided with an optical sensor having a photodetecting element such as a photodiode or a phototransistor, and particularly relates to a display device provided with an optical sensor in a pixel region.

BACKGROUND OF THE INVENTION

Conventionally, an optical-sensor-equipped display device has been proposed that is provided with photodetecting elements such as photodiodes in its pixels and thereby is capable of detecting a brightness of external light and capturing an image of an object approaching its display panel.

Such an optical-sensor-equipped display device is supposed to be used as a display device for two-way communication, or a display device having a touch panel function. In the case of a conventional optical-sensor-equipped display device, when known constituent elements such as signal lines and scanning lines, TFTs (thin film transistors), and pixel electrodes are formed on the active matrix substrate through semiconductor processing, photodiodes and the like are formed on the active matrix substrate through the same processing (see JP 2006-3857 A).

As a conventional optical sensor formed on an active matrix substrate, an exemplary configuration disclosed in WO2007/145346 and WO2007/145347 is shown in FIG. 62. The conventional optical sensor shown in FIG. 62 is composed mainly of a photodiode D1, a capacitor C2, and a transistor M2. To an anode of the photodiode D1, a line RST for supplying a reset signal is connected. To a cathode of the photodiode D1, one of electrodes of the capacitor C2 and a gate of the transistor M2 are connected. A drain of the transistor M2 is connected to a line VDD, and a source thereof is connected to a line OUT. The other electrode of the capacitor C2 is connected to a line RWS for supplying a readout signal.

In this configuration, a sensor output $V_{PIX}$ according to an amount of light received by the photodiode D1 can be obtained by supplying a reset signal and a readout signal to the line RST and the line RWS, respectively, at respective predetermined timings. Here, an operation of the conventional optical sensor as shown in FIG. 62 is explained with reference FIG. 63. It should be noted that in FIG. 63, a low level (e.g., −7 V) of the reset signal is denoted by "$V_{RST.L}$", a high level (e.g., 0 V) of the reset signal is denoted by "$V_{RST.H}$", a low level (e.g., 0 V) of the readout signal is denoted by "$V_{RWS.L}$", and a high level (e.g., 15 V) of the readout signal is denoted by "$V_{RWS.H}$".

First, when the high-level reset signal $V_{RST.H}$ is supplied to the line RST, the photodiode D1 is forward-biased, and a potential $V_{INT}$ of the gate of the transistor M2 is therefore expressed by the following formula (1):

$$V_{INT} = V_{RST.H} - V_F \tag{1}$$

where $V_F$ is a forward voltage of the photodiode D1. Since $V_{INT}$ herein is lower than a threshold voltage of the transistor M2, the transistor M2 is non-conductive during a reset period.

Next, the reset signal becomes the low level potential $V_{RST.L}$ again (at the timing of $t_{RST}$ in FIG. 63), and thereby a photoelectric current integration period (a sensing period that is a period denoted by $T_{INT}$ shown in FIG. 63) starts. In the integration period, a photoelectric current proportional to an amount of light incident on the photodiode D1 flows out of the capacitor C2, whereby the capacitor C2 is discharged. Accordingly, the potential $V_{INT}$ of the gate of the transistor M2 at the end of the integration period is expressed by the following formula (2):

$$V_{INT} = V_{RST.H} - V_F - \Delta V_{RST} \cdot C_{PD}/C_{TOTAL} - I_{PHOTO} \cdot T_{INT}/C_{TOTAL} \tag{2}$$

where $\Delta V_{RST}$ represents a height of a pulse of the reset signal ($V_{RST.H} - V_{RST.L}$), $I_{PHOTO}$ represents a photoelectric current of the photodiode D1, and $T_{INT}$ represents a duration of the integration period. $C_{PD}$ represents a capacitance of the photodiode D1. $C_{TOTAL}$ represents a sum of a capacitance of the capacitor C2, the capacitance $C_{PD}$ of the photodiode D1, and a capacitance $C_{TFT}$ of the transistor M2. During the integration period also, since the $V_{INT}$ is lower than the threshold voltage of the transistor M2, the transistor M2 is non-conductive.

After the integration period ends, at the timing $t_{RWS}$ shown in FIG. 63, the readout signal RWS rises, and the readout period thereby starts. It should be noted that the readout period continues while the readout signal RWS remains at the high level. Here, the injection of charges into the capacitor C2 occurs. As a result, the potential $V_{INT}$ of the gate of the transistor M2 is expressed by the following formula (3):

$$V_{INT} = V_{RST.H} - V_F - \Delta V_{RST} \cdot C_{PD}/C_{TOTAL} - I_{PHOTO} \cdot T_{INT}/C_{TOTAL} + \Delta V_{RWS} \cdot C_{INT}/C_{TOTAL} \tag{3}$$

$\Delta V_{RWS}$ is a height of a pulse of the readout signal ($V_{RST.H} - V_{RWS.L}$). With this, the potential $V_{INT}$ of the gate of the transistor M2 becomes higher than the threshold voltage thereof, and this causes the transistor M2 to become conductive. Thus, the transistor M2, together with the bias transistor M3 provided at an end of the line OUT in each column, functions as a source-follower amplifier. In other words, the sensor output voltage $V_{PIX}$ from the transistor M2 is proportional to an integral of the photoelectric current of the photodiode D1 during the integration period.

It should be noted that in FIG. 63, the waveform indicated by a solid line represents variation of the potential $V_{INT}$ in the case where light incident on the photodiode D1 is small in amount. The waveform indicated by a broken line represents variation of the potential $V_{INT}$ in the case where saturation-level light is incident on the photodiode D1. $\Delta V_{SIG}$ shown in FIG. 63 represents a potential difference proportional to an amount of light incident on the photodiode D1. $\Delta V_{INT}$ shown in FIG. 63 is an amount by which the potential $V_{INT}$ is boosted by the application of the readout signal from the line RWS to the optical sensor during the readout period.

SUMMARY OF THE INVENTION

In a display device having an optical sensor in a pixel as described above, a difference between respective potentials of the accumulation node in cases with different illuminances (e.g., in the case of the dark state, and in the case where light at a saturation level is incident) at the end of the accumulation period is equal to a difference between respective potentials of the accumulation node in the foregoing respective cases after being boosted during the readout period. In other words, a difference between a potential (herein denoted by "$V_{INT1}$") of the accumulation node at the end of the accumulation period in the case of the dark state and a potential (herein denoted by "$V_{INT2}$") of the accumulation node at the end of the accumulation period in the case where light at a saturation level is incident is equal to a difference between a potential (herein denoted by "$V_{INT3}$") of the accumulation node after being boosted during the readout period in the case of the dark state and a potential (herein denoted by "$V_{INT4}$") of the accumulation node after being boosted during the readout period in the case where light at a saturation level is incident.

However, as the above-described difference between $V_{INT3}$ and $V_{INT4}$ is greater, an optical sensor having excellent characteristics, such as higher sensitivity and a higher S/N ratio, can be obtained. Therefore, it is an object of the present invention to provide a display device having a high-sensitivity optical sensor, by setting a difference between potentials ($V_{INT3}$−$V_{INT4}$) of the accumulation node after the boosting due to a difference of illuminances on a light-receiving face, greater than a difference between potentials ($V_{INT1}$−$V_{INT2}$) of the same at the end of the integration period.

In order to achieve the above-described object, a display device disclosed herein is a display device that includes an optical sensor in a pixel region on an active matrix substrate, wherein the optical sensor includes: a photodetecting element for receiving incident light; a reset signal line for supplying a reset signal to the optical sensor; a readout signal line for supplying a readout signal to the optical sensor; an accumulation node having a potential that varies with an amount of light received by the photodetecting element during a sensing period, the sensing period being a period from supply of the reset signal to supply of the readout signal; an amplifying element for amplifying the potential of the accumulation node according to the readout signal; and a sensor switching element for reading out the potential amplified by the amplifying element and outputting the potential as a sensor circuit output to an output line, wherein a light shielding film is provided on a side opposite to a light receiving surface side with respect to the photodetecting element, the light shielding film is connected to a power source for supplying a voltage for fixing a potential of the light shielding film to a constant potential, and the following formula is satisfied;

$$V_{LS} \geq V_{RST.H}$$

where $V_{LS}$ represents the constant potential and $V_{RST.H}$ represents a high level potential of the reset signal With the above-described configuration in which the amplifying element for amplifying the potential of the accumulation node according to the readout signal is provided, a difference between potentials of the accumulation node due to a difference between illuminances on the light receiving surface after boosting is greater than a difference between potentials of the same at the end of the integration period. For example, a difference between a potential of the accumulation node after the boosting during the readout period in the case of the dark state and a potential of the accumulation node after boosting during the readout period in the case where light at a saturation level is incident is greater than a difference between a potential of the accumulation node at the end of the accumulation period in the case of the dark state and a potential of the accumulation node at the end of the accumulation period in the case where light at a saturation level is incident. Therefore, a display device including an optical sensor with a high sensitivity can be realized. Moreover, by setting the potential of the light shielding film to a constant potential equal to or higher than the high level potential $V_{RST.H}$ of the reset signal, a sensor output having excellent linearity with respect to the incident light amount can be obtained.

DETAILED DESCRIPTION OF THE INVENTION

Figure 1:
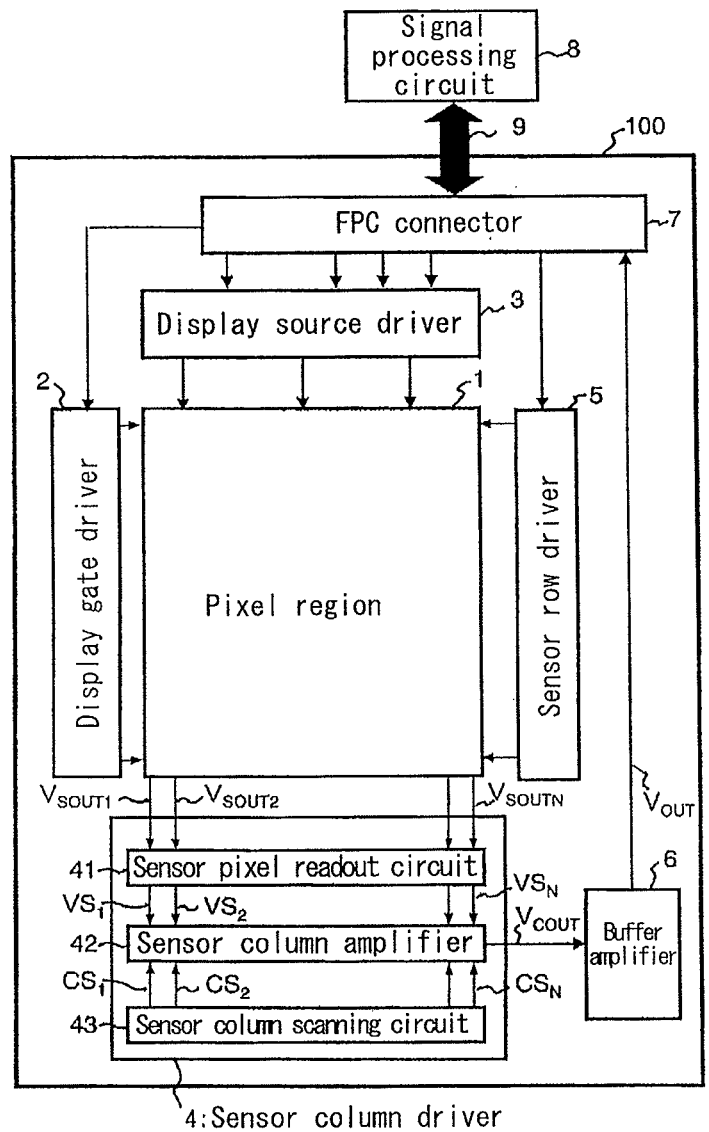
FIG. 1 is a block diagram showing a schematic configuration of a display device according to one embodiment of the present invention.

A display device according to one embodiment of the present invention is a display device that includes an optical sensor in a pixel region on an active matrix substrate, wherein the optical sensor includes: a photodetecting element for receiving incident light; a reset signal line for supplying a reset signal to the optical sensor; a readout signal line for supplying a readout signal to the optical sensor; an accumulation node having a potential that varies with an amount of light received by the photodetecting element during a sensing period, the sensing period being a period from supply of the reset signal to supply of the readout signal; an amplifying element for amplifying the potential of the accumulation node according to the readout signal; and a sensor switching element for reading out the potential amplified by the amplifying element and outputting the potential as a sensor circuit output to an output line.

With this configuration in which the amplifying element for amplifying the potential of the accumulation node according to the readout signal is provided, a difference between potentials of the accumulation node due to a difference between illuminances on the light receiving surface after boosting is greater than a difference between potentials of the same at the end of the integration period. For example, a difference between a potential of the accumulation node after the boosting during the readout period in the case of the dark state and a potential of the accumulation node after boosting during the readout period in the case where light at a saturation level is incident is greater than a difference between a potential of the accumulation node at the end of the accumulation period in the case of the dark state and a potential of the accumulation node at the end of the accumulation period in the case where light at a saturation level is incident. It should be noted that this function of amplifying the potential difference is established between any illuminances, not exclusively to the case of the dark state and the case where light at a saturation level is incident. Thus, a display device including an optical sensor with a high sensitivity can be provided.

Further, the above-described configuration is preferably modified so that a light shielding film is provided on a side opposite to a light receiving surface side with respect to the photodetecting element, the light shielding film is connected to a power source for supplying a voltage for fixing a potential of the light shielding film to a constant potential, and the following formula is satisfied:

$$V_{LS} \geq V_{RST.H}$$

where $V_{LS}$ represents the constant potential and $V_{RST.H}$ represents a high level potential of the reset signal. With this preferable configuration, the potential fluctuations of the light shielding film can be eliminated, whereby the degradation of characteristics of the diode D1 can be suppressed.

In the case where a PIN diode is used as the photodetecting element, it is further preferable that the following formula is satisfied:

$$V_{LS} \geq V_{RST.H} + V_{th\_p}$$

where $V_{th\_p}$ represents a p-channel threshold voltage of the PIN diode. With this preferable configuration, the PIN diode can be caused to operate in a state in which at both interfaces of the i-layer on the p-layer side and the n-layer side in the diode, migration of free electrons and positive holes tends to occur. Therefore, a light current (photoelectric current) is increased, and the linearity of variation of a light current (photoelectric current) with respect to illuminance variation can be improved.

In the above-described display device, for example, a variable capacitor can be used as the amplifying element. In this case, as the variable capacitor, for example, a MOS capacitor can be used that includes the readout signal line, an insulation film, and a p-type semiconductor region formed in a silicon film. Alternatively, as the variable capacitor, a MOS capacitor can be used that includes a gate electrode of the sensor switching element, an insulation film, and an n-type semiconductor region formed in a silicon film. With the above-described configuration, the readout signal line can be used as a gate of the variable capacitor. Therefore, this configuration has an advantage that it is unnecessary to provide lines and contacts for connecting the readout signal line and the gate electrode.

Still further, in the above-described display device, for example, a p-channel thin film transistor can be used as the amplifying element. In this case, it is preferable that in the p-channel thin film transistor, a channel region is formed in a wide portion of a silicon film that connects the photodetecting element and the accumulation node with each other, and a gate electrode of the p-channel thin film transistor is provided so as to overlap the wide portion. With this configuration, the boundary length can be decreased, which prevents a parasitic capacitance or a leakage current from narrowing the dynamic range. Alternatively, in the above-described display device, an n-channel thin film transistor may be used as the amplifying element.

Alternatively, in the above-describe display device, a diode having a gate electrode on a channel may be used as the amplifying element. With this configuration, the boundary length can be decreased.

Further, as another preferable configuration, the above-described display device may have a configuration in which an electrode is provided that is opposed to the light shielding film so as to form a serial capacitance with respect to a parasitic capacitance between the light shielding film and the photodetecting element, and the electrode is connected electrically with the readout signal line. This configuration has an effect of reducing influences that a parasitic capacitance between the light shielding film and the photodetecting element exerts on potential variation of the accumulation node during the integration period.

Further, in the above-described display device, preferably, a plurality of the photodetecting elements are provided in the pixel region, the plurality of photodetecting elements are connected in parallel, and the amplifying element is connected to one of the photodetecting elements positioned at an end of the photodetecting elements. By connecting a plurality of the photodetecting elements in parallel in this way, a photoelectric current can be increased, whereby the sensitivity can be improved.

In the above-described display device, preferably, the sensor switching element is a three-terminal switching element, a gate electrode among the three terminals is connected to the accumulation node, and one of the other two terminals among the three terminals is connected to the output line. With this configuration, one sensor switching element is sufficient, and therefore, the circuit configuration of the optical sensor can be simplified. It should be noted that in the above-described display device, a switching element for resetting the sensor switching element may be further provided.

In the above-described display device, the amplifying element preferably has a threshold potential at which a state of the amplifying element is switched between ON and OFF, in a range between a low level potential and a high level potential of the readout signal.

The above-described display device may be embodied as a liquid crystal display device that further includes a counter substrate opposed to the active matrix substrate; and liquid crystal interposed between the active matrix substrate and the counter substrate.

Hereinafter, more specific embodiments of the present invention are explained with reference to the drawings. It should be noted that the following embodiments show exemplary configurations in the case where a display device according to the present invention is embodied as a liquid crystal display device, but the display device according to the present invention is not limited to a liquid crystal display device, and the present invention is applicable to an arbitrary display device in which an active matrix substrate is used. It should be noted that a display device according to the present invention, as having optical sensors, is assumed to be used as a touch-panel-equipped display device that detects an object approaching its screen and carries out an input operation, as a display device for two-way communication having a display function and an image pickup function, etc.

Further, the drawings referred to hereinafter show, in a simplified manner, only principal members illustration of which is needed for explanation of the present invention, among constituent members of an embodiment of the present invention, for convenience of explanation. Therefore, a display device according to the present embodiment may include arbitrary members that are not shown in the drawings that the present specification refers to. Further, the dimensions of the members shown in the drawings do not faithfully reflect actual dimensions of constituent members, dimensional ratios of the constituent members, etc.

First, a configuration of an active matrix substrate provided in a liquid crystal display device according to Embodiment 1 of the present invention is explained with reference to FIGS. 1 and 2.

FIG. 1 is a block diagram illustrating a schematic configuration of an active matrix substrate 100 provided in a liquid crystal display device according to one embodiment of the present invention. As shown in FIG. 1, the active matrix substrate 100 includes, on its glass substrate, at least a pixel region 1, a display gate driver 2, a display source driver 3, a sensor column driver 4, a sensor row driver 5, a buffer amplifier 6, and an FPC (flexible printed circuit) connector 7. Further, a signal processing circuit 8 for processing an image signal captured by a photodetecting element (to be described later) in the pixel region 1 is connected to the active matrix substrate 100 via the FPC connector 7 and an FPC 9.

It should be noted that the above-described constituent members on the active matrix substrate 100 may be formed monolithically on the glass substrate through semiconductor processing. Alternatively, the configuration may be as follows: the amplifiers and drivers among the above-described members are mounted on the glass substrate by, for example, COG (chip on glass) techniques. Further alternatively, at least a part of the aforementioned members shown on the active matrix substrate 100 in FIG. 1 could be mounted on the FPC 9. The active matrix substrate 100 is laminated with a counter substrate (not shown) having a counter electrode formed over an entire surface thereof. A liquid crystal material is sealed in the space between the active matrix substrate 100 and the counter substrate.

The pixel region 1 is a region where a plurality of pixels are formed for displaying images. In the present embodiment, an optical sensor for capturing images is provided in each pixel in the pixel region 1. FIG. 2 is an equivalent circuit diagram showing an arrangement of pixels and optical sensors in the pixel region 1 in the active matrix substrate 100. In the example shown in FIG. 2, one pixel is formed with three sub-pixels of R (red), G (green), and B (blue). In one pixel composed of these three sub-pixels, there is provided one optical sensor. The pixel region 1 includes the pixels arrayed in a matrix of M rows×N columns, and the optical sensors arrayed likewise in a matrix of M rows×N columns. It should be noted that the number of the sub-pixels is M×3N, as described above.

Figure 2:
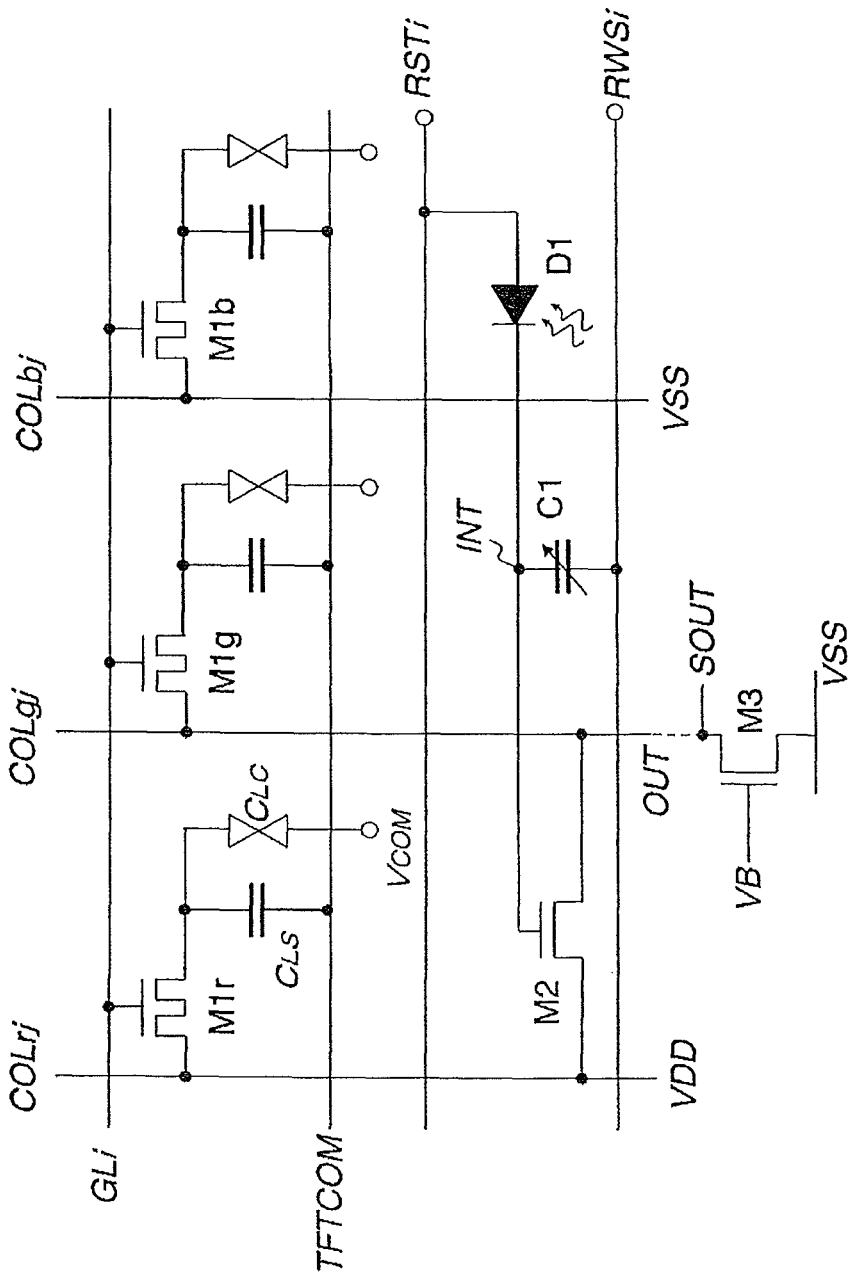
FIG. 2 is an equivalent circuit diagram showing a configuration of one pixel in a display device according to Embodiment 1 of the present invention.

As shown in FIG. 2, therefore, the pixel region 1 has gate lines GL and source lines COL arrayed in matrix as lines for pixels. The gate lines GL are connected with the display gate driver 2. The source lines COL are connected with the display source driver 3. It should be noted that M rows of the gate lines GL are provided in the pixel region 1. Hereinafter, when an individual gate line GL needs to be described distinctly, it is denoted by GLi (i=1 to M). On the other hand, three source lines COL are provided per one pixel so as to supply image data to three sub-pixels in the pixel, as described above. When an individual source line COL needs to be described distinctly, it is denoted by COLrj, COLgj, or COLbj (j=1 to N).

At each of intersections of the gate lines GL and the source lines COL, a thin-film transistor (TFT) M1 is provided as a switching element for a pixel. It should be noted that in FIG. 2, the thin film transistors M1 provided for sub-pixels of red, green, and blue are denoted by M1r, M1g, and M1b, respectively. A gate electrode of the thin-film transistor M1 is connected to the gate line GL, a source electrode thereof is connected to the source line COL, and a drain electrode thereof is connected to a pixel electrode, which is not shown. Thus, a liquid crystal capacitor $C_{LC}$ is formed between the drain electrode of the thin film transistor M1 and the counter electrode (VCOM), as shown in FIG. 2. Further, an auxiliary capacitor $C_{LS}$ is formed between the drain electrode and a TFT COM.

In FIG. 2, for a sub-pixel driven by a thin-film transistor M1r connected to an intersection of one gate line GLi and one source line COLrj, a red color filter is provided so as to correspond to this sub-pixel. This sub-pixel is supplied with image data of red color from the display source driver 3 via the source COLrj, thereby functioning as a red sub-pixel. Further, for a sub-pixel driven by a thin-film transistor M1g connected to an intersection of the gate line GLi and the source line COLgj, a green color filter is provided so as to correspond to this sub-pixel. This sub-pixel is supplied with image data of green color from the display source driver 3 via the source line COLgj, thereby functioning as a green sub-pixel. Still further, for a sub-pixel driven by a thin-film transistor M1b connected to an intersection of the gate line GLi and the source line COLbj, a blue color filter is provided so as to correspond to this sub-pixel. This sub-pixel is supplied with image data of blue color from the display source driver 3 via the source line COLbj, thereby functioning as a blue sub-pixel.

It should be noted that in the example shown in FIG. 2, the optical sensors are provided so that one optical sensor corresponds to one pixel (three sub-pixels) in the pixel region 1. The ratio between the pixels and the optical sensors provided, however, is not limited to this example, but is arbitrary. For example, one optical sensor may be provided per one sub-pixel, or one optical sensor may be provided per a plurality of pixels.

The optical sensor includes a photodiode D1 as a photodetecting element, a capacitor C1 (amplifying element), and a transistor M2, as shown in FIG. 2. The capacitor C1 functioning as an amplifying element in the present embodiment is a variable capacitor.

In the example shown in FIG. 2, the source line COLr also functions as the line VDD for supplying a constant voltage $V_{DD}$ to the optical sensor from the sensor column driver 4. Further, the source line COLg also functions as the line OUT for outputting a sensor output.

To an anode of the photodiode D1, the line RST for supplying a reset signal is connected. To a cathode of the photodiode D1, one of electrodes of the capacitor C1 and a gate of the transistor M2 are connected. A drain of the transistor M2 is connected to the line VDD, and a source thereof is connected to the line OUT. In FIG. 2, a junction point (accumulation node) at which the cathode of the photodiode D1, the one of electrodes of the capacitor C1, and the gate of the transistor M2 are connected is denoted by "INT". The other electrode of the capacitor C1 is connected to the line RWS for supplying a readout signal. The lines RST and the lines RWS are connected to the sensor row driver 5. These lines RST and RWS are provided per each row. Therefore, hereinafter, when the lines should be distinguished, they are denoted by RSTi and RWSi (i=1 to M).

The sensor row driver 5 selects the lines RSTi and RWSi in combination shown in FIG. 2 sequentially at predetermined time intervals $t_{row}$. In this way, the rows of the optical sensors from which signal charges are to be read out are selected sequentially in the pixel region 1.

It should be noted that, as shown in FIG. 2, a drain of an insulated gate field effect transistor M3 is connected to an end of the line OUT. To the drain of the transistor M3, the output line SOUT is connected. Therefore, a potential $V_{SOUT}$ of the drain of the transistor M3 is output as an output signal from the optical sensor, to the sensor column driver 4. A source of the transistor M3 is connected to the line VSS. A gate of the transistor M3 is connected to a reference voltage source (not shown) via a reference voltage line VB.

Figure 3:
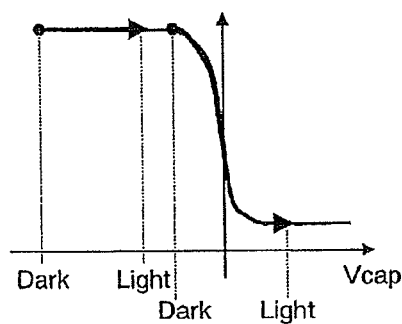
FIG. 3 shows CV characteristics of a capacitor provided in an optical sensor according to Embodiment 1.
Figure 4:
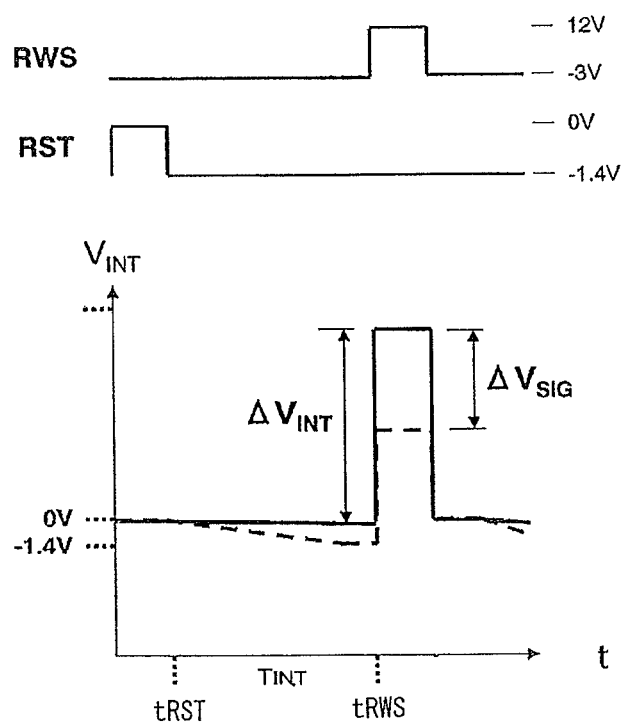
FIG. 4 is a timing chart showing a waveform of a driving signal and variation of a potential of an accumulation node in the optical sensor according to Embodiment 1.
Figure 63:
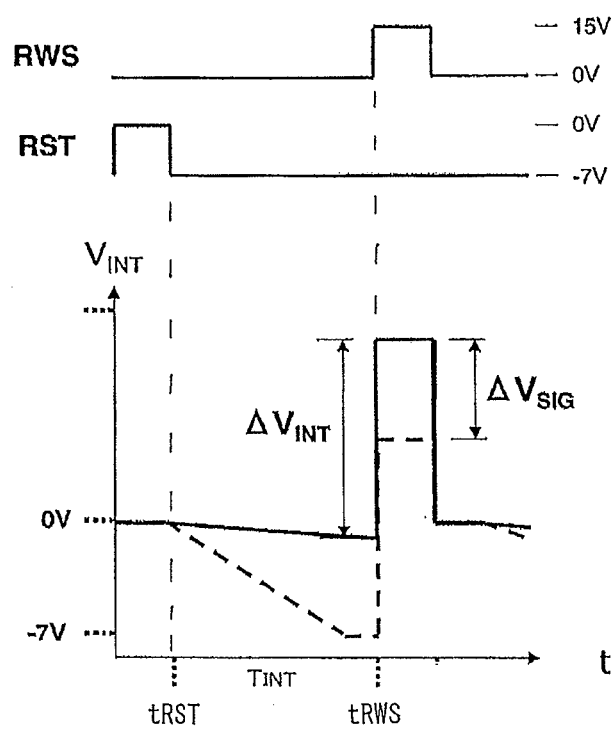
FIG. 63 is a timing chart showing a waveform of a driving signal and variation of a potential of an accumulation node in the conventional optical sensor.

FIG. 3 is a CV characteristic diagram of the capacitor C1. In FIG. 3, the horizontal axis indicates an interelectrode voltage $V_{CAP}$ of the capacitor C1, and the vertical axis indicates an electrostatic capacitance. As shown in FIG. 3, the capacitor C1 is characterized in that it has an electrostatic capacitance that is constant when the interelectrode voltage $V_{CAP}$ is small, but exhibits a precipitous change immediately before and after the interelectrode voltage $V_{CAP}$ reaches a threshold value. Therefore, the characteristics of the capacitor C1 can be varied dynamically with a potential of a readout signal supplied from the line RWS. The use of the capacitor C1 having such characteristics allows the optical sensor according to the present embodiment to read out an amplified value of a change in the potential of the accumulation node during an integration period $T_{INT}$, as shown in FIG. 4. The example shown in FIG. 4 is merely one embodiment, in which a low level $V_{RST.L}$ of the reset signal is −1.4 V and the high level $V_{RST.H}$ of the reset signal is 0 V. The low level $V_{RWS.L}$ of the readout signal is −3 V and the high level $V_{RWS.H}$ of the readout signal is 12 V. In FIG. 4 also, the waveform indicated by the solid line represents variation of the potential $V_{INT}$ in the case where light incident on the photodiode D1 is small in amount, and the waveform indicated by the broken line represents variation of the potential $V_{INT}$ in the case where light at a saturation level is incident on the photodiode D1. $\Delta V_{SIG}$ is a potential difference proportional to an amount of light incident on the photodiode D1. As is clear from comparison between the conventional example shown in FIG. 63 and the configuration shown in FIG. 4, in the optical sensor according to the present embodiment, a change in the potential of the accumulation node during the integration period $T_{INT}$ in the case where light at a saturation level is incident is smaller than that of the conventional optical sensor. The optical sensor according to the present embodiment, however, amplifies of the potential of the accumulation node and reads it out during the readout period (the period while the potential of the readout signal is at the high level $V_{RWS.H}$).

Here, the readout of a sensor output from the pixel region 1 is explained with reference to FIG. 4. First, when the reset signal supplied from the sensor row driver 5 to the line RST rises from the low level ($V_{RST.L}$) to the high level ($V_{RST.H}$), the photodiode D1 is forward-biased. As a result, the potential $V_{INT}$ of the junction point INT has a value expressed by the following formula (4):

$$V_{INT} = V_{RST.H} - V_F \quad (4)$$

where $V_F$ represents a forward voltage of the photodiode D1. Since $V_{INT}$ herein is lower than the threshold voltage of the transistor M2, the transistor M2 is non-conductive during the reset period.

Next, when the reset signal returns to the low level $V_{RST.L}$, the photoelectric current integration period ($T_{INT}$) starts. During the integration period $T_{INT}$, a photoelectric current proportional to an amount of light incident on the photodiode D1 flows into the capacitor C1, whereby the capacitor C1 is discharged. This makes the potential $V_{INT}$ of the junction point INT at the end of the integration period $T_{INT}$ have a value expressed by the following formula (5):

$$V_{INT} = V_{RST.H} - V_F - \Delta V_{RST} \cdot C_{PD}/C_{TOTAL} - I_{PHOTO} \cdot t_{INT}/C_{TOTAL} \quad (5)$$

where $\Delta V_{RST}$ represents a height of a pulse of the reset signal ($V_{RST.H} - V_{RST.L}$); $I_{PHOTO}$ represents a photoelectric current of the photodiode D1; $t_{INT}$ represents a length of the integration period; $C_{PD}$ represents a capacitance of the photodiode D1; and $C_{TOTAL}$ represents a capacitance of an entirety of the optical circuit, that is, a total capacitance of the junction point INT, which is a sum of a capacitance $C_{INT}$ of the capacitor C1, a capacitance $C_{PD}$ of the photodiode D1, and a capacitance $C_{TFT}$ of the transistor M2. During the integration period also, since $V_{INT}$ is lower than the threshold voltage of the transistor M2, the transistor M2 is non-conductive.

After the integration period ends, the readout signal supplied to the line RWS rises, and the readout period starts. Here, injection of electric charges to the capacitor C1 occurs. When the potential $V_{INT}$ of the junction point INT becomes higher than the threshold voltage of the transistor M2, the transistor M2 becomes conductive. Then, the transistor M2, together with the bias transistor M3 provided at en end of the line OUT at each column, functions as a source follower amplifier. In the optical sensor according to the present embodiment, an output signal voltage from the output line SOUT from the drain of the transistor M3 is equivalent to a value obtained by amplifying an integral of the photoelectric current of the photodiode D1 during an integration period. Principles of this will be described later.

As described above, in the present embodiment, initialization with a reset pulse, integration of a photoelectric current during the integration period, and readout of a sensor output during the readout period, which are assumed to constitute one cycle, are performed cyclically.

Figure 5:
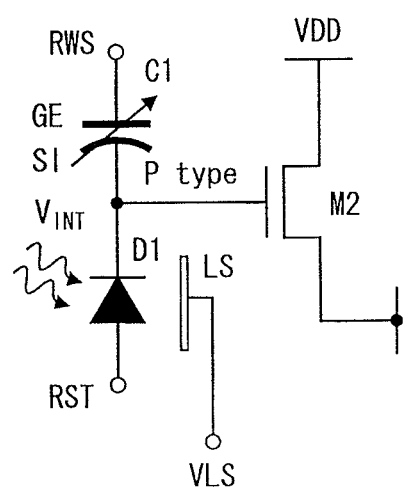
FIG. 5 is an equivalent circuit diagram of an optical sensor according to the present embodiment.
Figure 6:
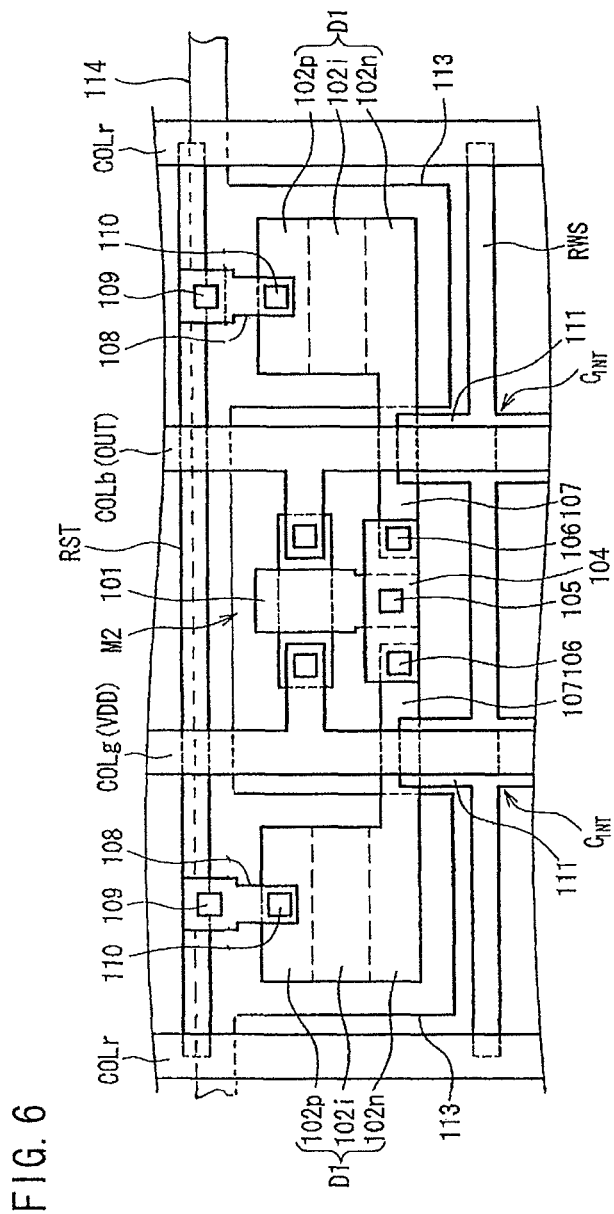
FIG. 6 is a plan view showing an exemplary planar structure of an optical sensor according to the present embodiment.
Figure 7:
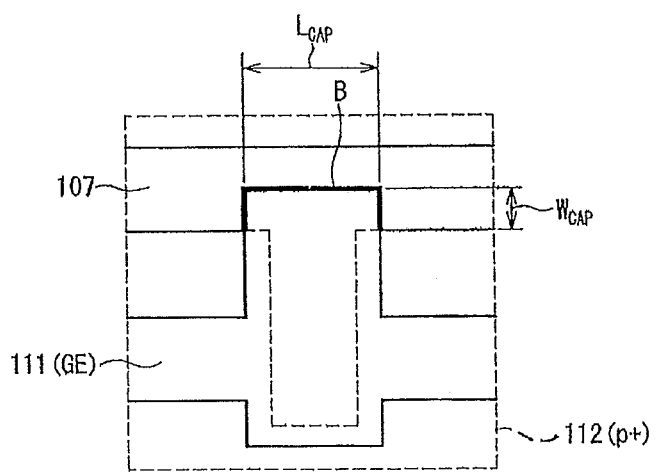
FIG. 7 is an enlarged view of a region where a capacitor C1 is formed.
Figure 8:
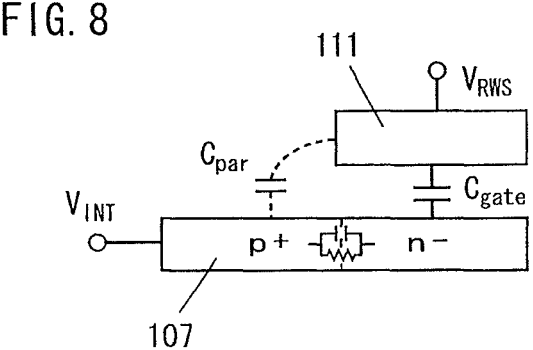
FIG. 8 is a schematic cross-sectional view showing a connection relationship of respective regions in an optical sensor according to the present embodiment.

Hereinafter, a specific configuration of an optical sensor according to the present embodiment is explained with reference to the drawings. FIG. 5 is an equivalent circuit diagram of an optical sensor according to Embodiment 5. FIG. 6 is a plan view showing an exemplary planar structure of the optical sensor according to the present embodiment. FIG. 7 is an enlarged view of a region where the capacitor C1 is formed. FIG. 8 is a schematic cross-sectional view showing a connection relationship of respective regions in the optical sensor according to the present embodiment.

As shown in FIG. 5, the optical sensor according to the present embodiment includes a capacitor C1 that is a variable capacitor, as an amplifying element. In the present embodiment, the capacitor C1 is a p-channel MOS capacitor. It should be noted that in FIG. 6, the transistor M2 is provided in an area between the source lines COLg and COLb, and is provided with two sets of the capacitor C1 and the diode D1 on both sides thereof, respectively. Alternatively, only one set of the capacitor C1 and the diode D1 may be provided. On a back side of the diode D1, a light shielding film LS for preventing light of the backlight from being incident on the diode D1 is provided. The light shielding film LS has a potential that is fixed to a constant potential $V_{LS}$ at least while the optical sensor is operating.

By fixing the potential of the light shielding film LS to the constant potential $V_{LS}$, the reliability of the photodiode can be improved. In the case where the potential of the light shielding film LS is floating, the potential of the light shielding film LS possibly fluctuates from an initial value due to carrier transfer or injection, whereby characteristics of the diode D1 possibly vary and degrade. This problem, however, can be solved by fixing the potential of the light shielding film LS to the constant potential $V_{LS}$.

Besides, differences in the characteristics among a plurality of the diodes D1 can be reduced. This is because, if the potential of the light shielding film LS is floating, the light shielding films LS possibly have different floating potentials due to non-uniform charge-up of plasma ions or the like in a processing process. In contrast, by fixing the potential of the light shielding film LS to the constant potential $V_{LS}$, this problem can be solved.

Further, interference noises with various signals for display can be reduced. This is because, since the light shielding film LS is capacity-coupled with the source lines COL, the pixel electrodes, etc., in the case where the potential of the light shielding film LS is floating, the potential of the light shielding film LS is influenced by potential fluctuations of the various signals for display (the source line potentials, the pixel electrode potentials, etc.). Such fluctuations of the potential of the light shielding film LS further add noises to the optical sensor. In contrast, by fixing the potential of the light shielding film LS to a constant potential $V_{LS}$, potential fluctuations of the light shielding film LS can be eliminated, whereby the above-described problem can be solved.

It should be noted that the following relationship is preferably satisfied:

$$V_{LS} \geq V_{RST.H}$$

where $V_{LS}$ represents a constant potential of the light shielding film LS, and $V_{RST.H}$ represents a high-level potential of the reset signal. Besides, the following relationship is more preferably satisfied:

$$V_{LS} \geq V_{RST.H} + V_{th\_p}$$

where $V_{th\_p}$ represents a p-channel threshold voltage of the diode D1. The reason for this will be described in detail later.

As shown in FIG. 6, the optical sensor according to the present embodiment includes the transistor M2 in an area between the source lines COLg and COLb. The diode D1 is a lateral-structure PIN diode in which a p-type semiconductor region 102p, an i-type semiconductor region 102i, and an n-type semiconductor region 102n are formed in series on a silicon film as a base. The p-type semiconductor region 102p functions as an anode of the photodiode D1, and is connected to a line RST via a line 108 and contacts 109 and 110. The n-type semiconductor region 102n functions as a cathode of the photodiode D1, and is connected to a gate electrode 101 of the transistor M2 via an extended portion 107 of the silicon film, contacts 105 and 106, and a line 104.

In this configuration, the lines RST and RWS are formed with the same metal as the metal of the gate electrode 101 of the transistor M2, and on the same layer through the same process as the layer and the process for the gate electrode 101. Besides, the lines 104 and 108 are formed with the same metal as the metal of the source line COL, and on the same layer through the same process as the layer and the process for the source line COL. On the backside of the photodiode D1, a metal film 113 that functions as the light shielding film LS (see FIG. 5) is provided. As described above, the potential of the metal film 113 as the light shielding film LS is fixed to the constant potential $V_{LS}$. Therefore, the metal film 113 is connected to a line 114. The line 114 is connected to a constant voltage power source (not shown) outside the pixel region 1. It should be noted that a configuration in which the line 114 for supplying the constant potential $V_{LS}$ to the metal film 113 functioning as the light shielding film LS is provided in parallel with the reset line RST is exemplarily shown in FIG. 6, but the configuration regarding the line 114 is not limited to this specific example.

Further, as shown in FIGS. 6 to 8, the capacitor C1 is formed with a wide portion 111 formed in the line RWS, the extended portion 107 of the silicon film, and an insulation film (not shown) provided between the wide portion 111 and the extended portion 107. In other words, the wide portion 111 having the same potential as that of the line RWS functions as a gate electrode of the capacitor C1. A region 112 shown in FIG. 7 is a p+ region formed by doping a p-type impurity such as boron into an n-type silicon film. It should be noted that when the p-type impurity is doped, the wide portion 111 functions as a mask. Therefore, as shown in FIG. 8, the extended portion 107 becomes the p+ region, and a portion of the silicon film below the wide portion 111 forms an n- region.

Figure 9:
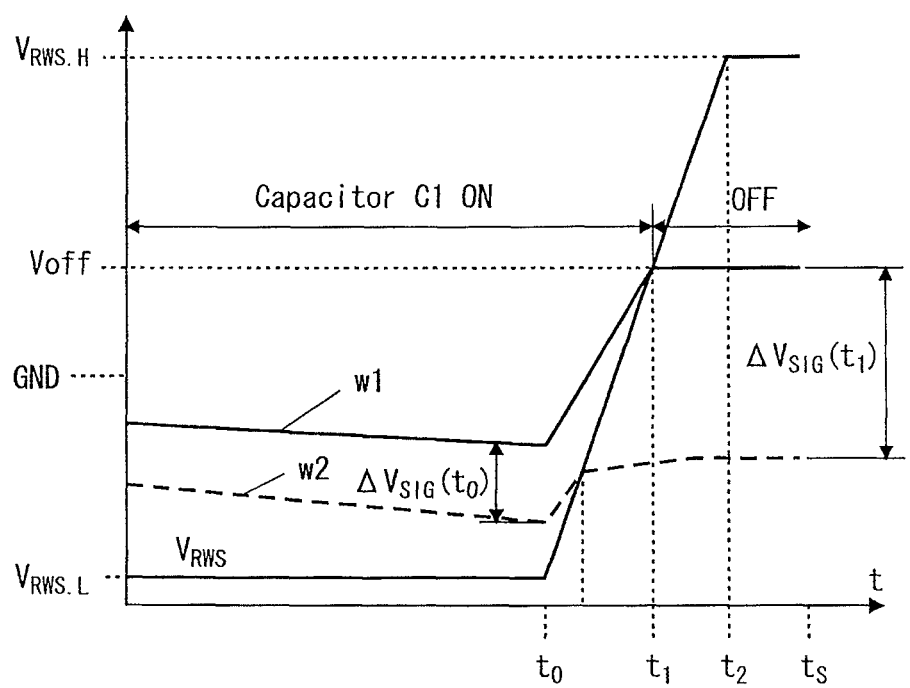
FIG. 9 is a waveform diagram showing variation of a potential $V_{INT}$ of an accumulation node from an end of an integration period to a readout period.

Here, a readout operation of the optical sensor according to the present embodiment is explained below. FIG. 9 is a waveform diagram showing variation of the potential $V_{INT}$ of the accumulation node from the end of the integration period to the readout period. In FIG. 9, the waveform w1 indicated by a solid line represents variation of the potential $V_{INT}$ in the case where light incident on the photodiode D1 is small in amount. The waveform w2 indicated by the broken line represents variation of the potential $V_{INT}$ in the case where light is incident on the photodiode D1. The time $t_0$ is a time at which the readout signal supplied from the line RWS starts rising from the low level $V_{RWS.L}$. The time $t_2$ is a time at which the readout signal reaches the high level $V_{RWS.H}$. The time $t_S$ is a time at which the transistor M2 is turned on and sampling of a sensor output is carried out. The time $t_1$ is a time at which the readout signal reaches the threshold voltage $V_{off}$ of the capacitor C1. In other words, the capacitor C1 has operation characteristics that are altered according to the magnitude relation between the potential supplied from the readout signal line RWS to the wide portion 111 and the threshold voltage $V_{off}$.

Figure 10A:
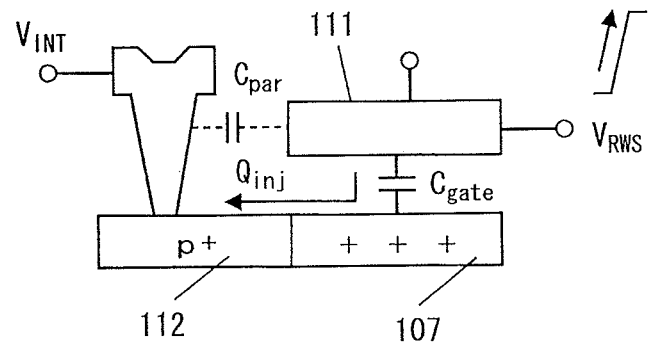
FIG. 10A is a schematic cross-sectional view showing charge transfer in a capacitor C1 when a potential of a gate electrode is lower than a threshold voltage.
Figure 10B:
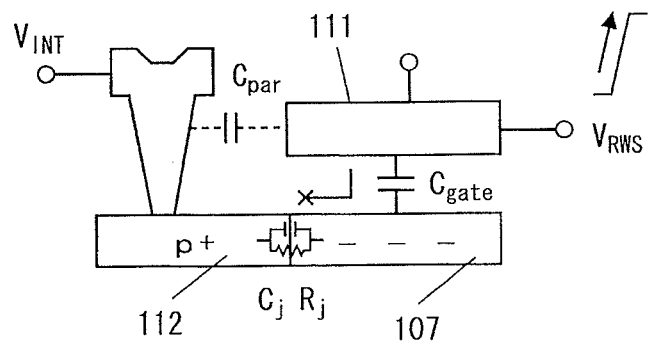
FIG. 10B is a schematic cross-sectional view showing charge transfer in a capacitor C1 when a potential of a gate electrode is higher than a threshold voltage.

FIGS. 10A and 10B are cross-sectional schematic diagrams showing a difference in the transfer of charges due to the potential of the gate electrode (wide portion 111) in the capacitor C1. As shown in FIGS. 9, 10A, and 10B, the capacitor C1 is always in an ON state before the time $t_1$, and after the time $t_1$, the capacitor C1 is in an OFF state. In other words, while the potential of the line RWS is at or below the threshold voltage $V_{off}$, transfer of charges $Q_{inj}$ occurs under the gate electrode (wide portion 111) as shown in FIG. 10A. However, when the potential of the line RWS exceeds the threshold voltage $V_{off}$, there is no transfer of charges $Q_{inj}$ under the gate electrode (wide portion 111) as shown in FIG. 10B. As described so far, the potential $V_{INT}(t_s)$ of the accumulation node at a sampling time $t_s$ after the potential of the readout signal supplied from the readout signal line RWS reaches the high level $V_{RWS.H}$ is as expressed by the formula (6) shown below. It should be noted that $\Delta V_{INT}$ shown in FIG. 4 is equivalent to a difference between $V_{INT}(t_0)$ and $V_{INT}(t_s)$, which is equal to $Q_{inj}/C_{INT}$.

$$\begin{aligned} V_{INT}(t_S) &= V_{INT}(t_0) + \frac{Q_{inj}}{C_{TOTAL}} \\ &= V_{INT}(t_0) + \int \frac{C_{INT}}{C_{TOTAL}} \cdot dV \\ &= V_{INT}(t_0) + \left[ \int_{V_{RHS}(L)}^{V_{off}} \frac{C_{INT}}{C_{INT} + C_{TFT} + C_{DIODE}} \cdot dV + \int_{V_{off}}^{V_{RWS}(H)} \frac{C'_{INT}}{C'_{INT} + C_{TFT} + C_{DIODE}} \cdot dV \right] \end{aligned} \quad (6)$$

where $$C_{INT} = C_{par} + C_{gate}$$

$$C'_{INT} = C_{par} + \frac{C_{gate} \cdot C_j}{C_{gate} + C_j}$$

As shown in FIG. 9, in the optical sensor according to the present embodiment, a potential difference of the accumulation node due to a difference of illuminance on the light receiving face after boosting is greater than a potential difference of the same at the end of the integration period. For example, a difference between a potential of the accumulation node after the boosting during the readout period in the case of the dark state and a potential of the accumulation node after boosting during the readout period in the case where light at a saturation level is incident is greater than a difference between a potential of the accumulation node at the end of the accumulation period in the case of the dark state and a potential of the accumulation node at the end of the accumulation period in the case where light at a saturation level is incident. Therefore, an optical sensor having a high sensitivity and a high S/N ratio can be realized.

Figure 11:
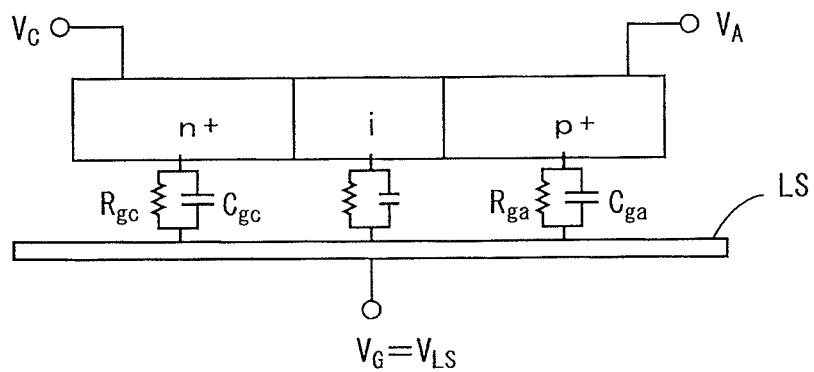
FIG. 11 is a schematic cross-sectional view of a PIN diode having a lateral structure.
Figure 12A:
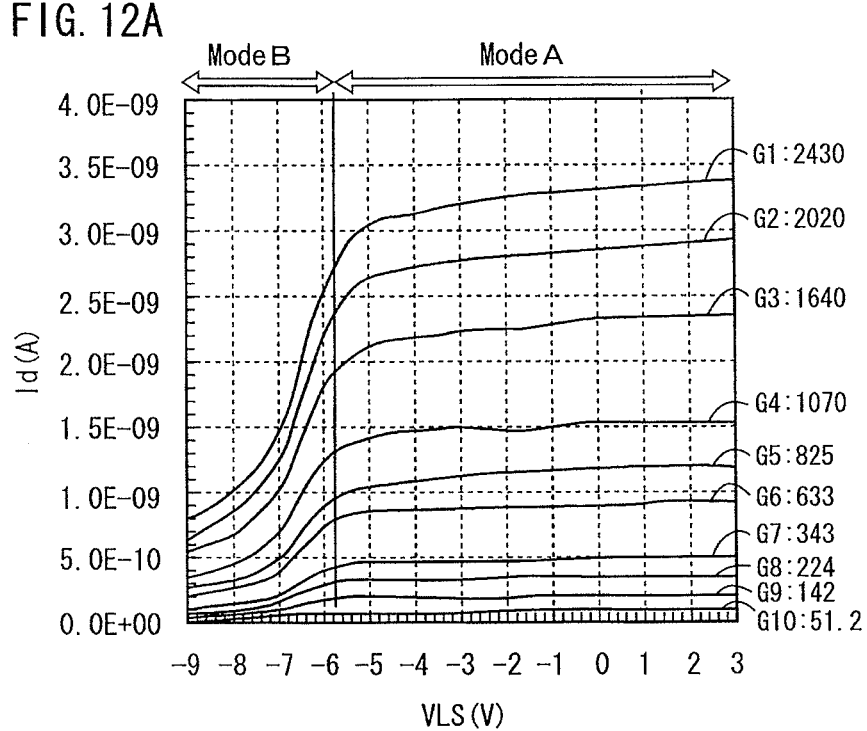
FIG. 12A is an $I_d$–$V_{LS}$ characteristic diagram showing differences among three operation modes of a PIN diode.
Figure 12B:
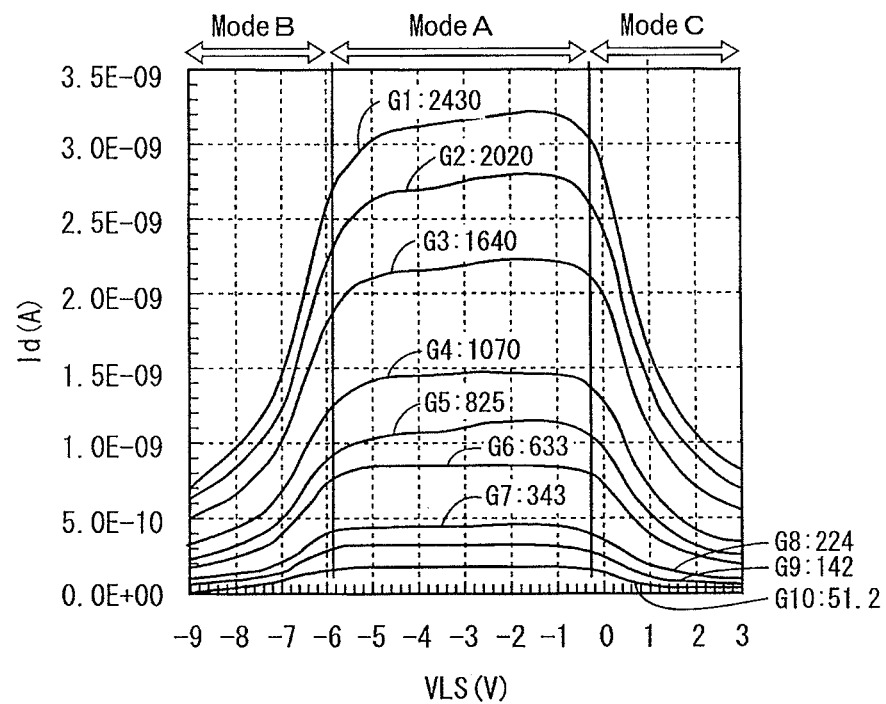
FIG. 12B is an $I_d$–$V_{LS}$ characteristic diagram showing differences among three operation modes of a PIN diode.
Figure 13:
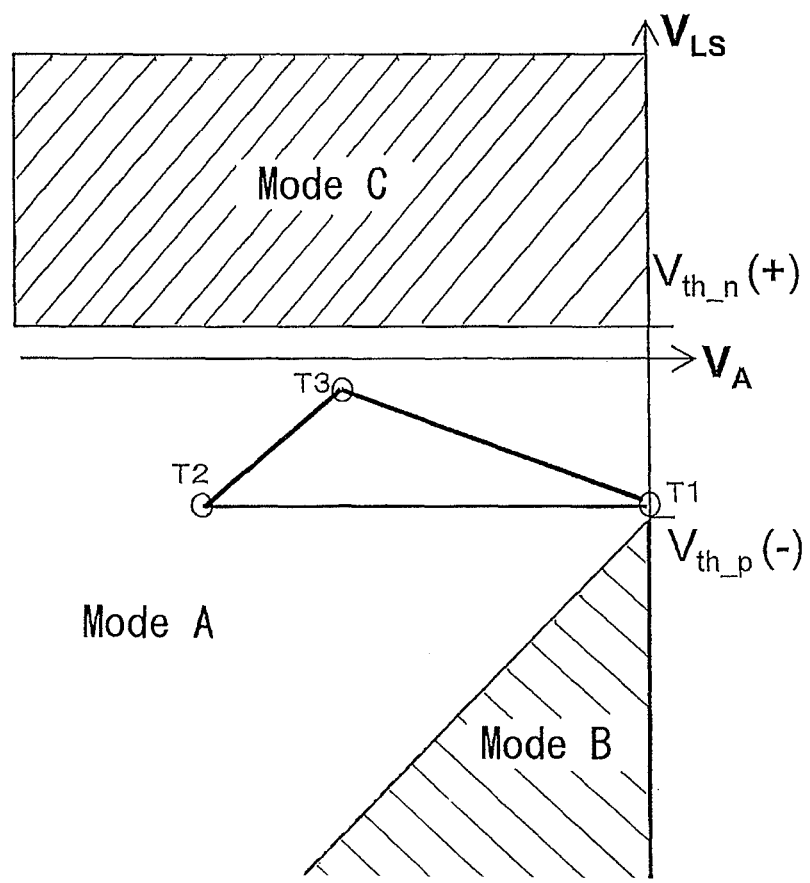
FIG. 13 is a graph showing the relationship between an anode potential $V_A$ and a potential $V_{LS}$ of a light shielding film LS.

Here, with reference to FIGS. 11 to 13, advantages of the optical sensor according to the present embodiment are explained. As described above, the optical sensor according to the present embodiment includes the light shielding film LS (see FIG. 5) for preventing the incidence of light of the backlight, on a surface of the photodiode D1 on a side opposite to the light receiving surface side, and the potential of the light shielding film is fixed to the constant potential $V_{LS}$. The constant potential $V_{LS}$ satisfies the following relationship with the high-level potential $V_{RST.H}$ of the reset signal and the p-channel threshold voltage $V_{th\_p}$ of the diode D1:

$$V_{LS} \geq V_{RST.H} + V_{th\_p}$$

By thus setting the constant potential $V_{LS}$ of the light shielding film LS, linearity of the photodiode D1 in a low illuminance range can be improved. The principles for this are explained below.

FIG. 11 is a schematic cross-sectional view of a PIN diode having a lateral structure. As shown in FIG. 11, in the case where the light shielding film LS is provided in the vicinity of the PIN diode having a lateral structure as is the case with the optical sensor according to the present embodiment, a parasitic capacitance generated between the diode and this light shielding film LS causes the diode to function as a three-terminal element. More specifically, the light shielding film LS, the p-layer, and the n-layer function as a gate, an anode, and a cathode, respectively, and the diode assumes three different operation modes, depending on the relation among the potential $V_{LS}$ of the gate, that is, the light shielding film LS, an anode potential $V_A$, and a cathode potential $V_C$.

FIGS. 12A and 12B are $I_d$-$V_{LS}$ characteristic diagrams showing differences among the above-described three operation modes. It should be noted that $I_d$ represents a light current of the diode. It should be noted that the light current is a current that is generated upon incidence of light on the diode, according to an amount of the incident light, and it is also called photocurrent. FIG. 12A is a graph showing a relationship between the potential $V_{LS}$ of the light shielding film LS and the light current $I_d$ in the case where the anode potential $V_A$ is −7 V and the cathode potential $V_C$ is 0 V. In the example shown in FIG. 12A, the behavior of the light current $I_d$ with respect to the potential $V_{LS}$ of the light shielding film LS changes around a point of $V_{LS}=V_C+V_{th\_p}$ as a demarcation point. Here, the operation mode in the range of $V_{LS} \leq V_A + V_{th\_p}$ is referred to as "mode B", and the operation mode in the range of $V_{LS} \geq V_A + V_{th\_p}$ is referred to as "mode A".

Further, FIG. 12B is a graph showing a relationship between the potential $V_{LS}$ of the light shielding film LS and the light current $I_d$ in the case where the anode potential $V_A$ is −7 V and the cathode potential $V_C$ is −3 V. In the example shown in FIG. 12B, the behavior of the light current $I_d$ with respect to the potential $V_{LS}$ of the light shielding film LS changes around a point of: $V_{LS}=V_A+V_{th\_p}$ as a demarcation point, and also, the behavior of the light current $I_d$ with respect to the potential $V_{LS}$ of the light shielding film LS changes around a point of $V_{LS}=V_C+V_{th\_n}$ as a demarcation point. Here, the operation mode in the range of $V_{LS} \leq V_A + V_{th\_p}$ is referred to as "mode B", the operation mode in the range of $V_A + V_{th\_p} \leq V_{LS} \leq V_C + V_{th\_n}$ is referred to as "mode A", and the operation mode in the range of $V_C + V_{th\_n} \leq V_{LS}$ is referred to as "mode C".

As is clear from FIGS. 12A and 12B, a high value of the light current $I_d$ can be obtained stably in the mode A, and the linearity of the light current with respect to illuminance is excellent. Therefore, in the present embodiment, the diode D1 preferably operates in the mode A. More specifically, in the case of $V_A + V_{th\_p} \leq V_{LS} \leq V_C + V_{th\_n}$ (mode A), both interfaces of the i-layer on the p-layer side and the n-layer side in the diode assume a state in which migration of free electrons and positive holes tends to occur. Therefore, in the mode A; the photoelectric current tends to smoothly flow through the diode and the dark current tends to decrease. Consequently, an excellent S/N ratio is obtained, and the linearity of the light current with respect to illuminance is improved.

On the other hand, in the case of $V_{LS} \leq V_A + V_{th\_p}$ (mode B), the n-layer side interface of the i-layer in the diode assumes a state in which migration of free electrons and positive holes tends to occur, while on the p-layer side interface of the i-layer in the diode, the electric current flow is obstructed by the i-layer. In contrast, in the case of $V_C + V_{th\_n} \leq V_{LS}$ (mode C), the p-layer side interface of the i-layer in the diode assumes a state in which the migration of free electrons and positive holes tends to occur, while on the n-layer side interface thereof, the electric current flow is obstructed by the i-layer. Therefore, in the cases of the modes B and C, the photoelectric current cannot flow smoothly through the diode, and the dark current tends to increase. Consequently, an excellent S/N ratio cannot be obtained.

Here, the distribution of the modes A, B, and C can be represented by the relationship between the anode potential $V_A$ and the potential $V_{LS}$ of the light shielding film LS as shown in FIG. 13. In FIG. 13, the region without hatching is the region of the mode A, the region hatched with diagonally right-down lines is the region of the mode B, and the region hatched with diagonally left-down lines is the region of the mode C. As described above, the region of the mode A can be expressed as:

$$V_A + V_{th\_p} \leq V_{LS} \leq V_C + V_{th\_n}$$

The region of the mode B can be expressed as:

$$V_{LS} \leq V_A + V_{th\_p}$$

The region of the mode C can be expressed as:

$$V_C + V_{th\_n} \leq V_{LS}$$

Among T1, T2, and T3 shown in FIG. 13, T1 is a coordinate point representing $V_{LS}$ and $V_A$ at a time at which the reset signal shown in FIG. 4 rises to the high level. T2 corresponds to a time $t_{RST}$ shown in FIG. 4 (i.e., a time when the reset signal is switched from the high level to the low level), and T3 corresponds to a time $t_{RWS}$ shown in FIG. 4 (i.e., a time when the readout signal is switched from the low level to the high level).

Here, a triangle formed with lines extended between T1 and T2, T2 and T3, and T3 and T1 preferably falls within the region of the mode A. Therefore, the following is preferably satisfied, as a requirement to be satisfied so that the value of $V_{LS}$ at T1 does not fall in the region of the mode B but falls in the region of the mode A:

$$V_{LS} \geq V_A + V_{th\_p}$$

It should be noted that the anode potential $V_A$ at the start of resetting is equal to the high-level potential $V_{RST.H}$ of the reset signal, and hence, the above-described formula can be expressed as:

$$V_{LS} \geq V_{RST.H} + V_{th\_p}$$

It should be noted that the value of $V_{LS}$ does not vary during the period of T1 to T2. When the reset signal is switched to a low level at the time $T_{RST}$ shown in FIG. 4, the accumulation period starts (T2 in FIG. 13). Then, until the readout signal is switched to the high level at the time $t_{RWS}$ shown in FIG. 4 (T3 in FIG. 13), a photoelectric current according to the amount of received light continuously flows, and the value of $V_{LS}$ increases. After the readout signal is switched to the high level at T3, the value of $V_{LS}$ returns to the initial state (T1).

It should be noted that in the present embodiment, since the variable capacitor is used as the capacitor C1, fluctuations of the cathode potential $V_C$ during the accumulation period are suppressed, as compared with the case where a usual (non-variable) capacitor is used. Therefore, $V_{LS}$ does not increase much during the accumulation period (from T2 to T3 in FIG. 13), which makes it possible to achieve an operation in the region of the mode A.

It should be noted in order to cause the diode D1 not to operate in the region of the mode C at T3, an amplification factor $A_{AC}$ of the capacitor C1 desirably satisfies the relationship expressed as:

$$A_{AC} \geq VDD/(V_{th\_n} - V_{th\_p})$$

where VDD represents a power source voltage of the output transistor M2. If this relationship is satisfied, a range of variation of the accumulation node potential $V_{int}$ expressed as $\Delta V_{th} = V_{th\_n} - V_{th\_p}$ can be caused to correspond to the output voltage range of 0 V to VDD.

As described above, by setting the value of the potential $V_{LS}$ of the light shielding film to a constant potential so that $V_{LS} \geq V_{RST.H} + V_{th\_p}$ should be satisfied, the photodiode D1 can be caused to operate in the mode A from the start of resetting to at least an initial stage of the accumulation period. It should be noted that if the diode operates in the mode B near the start of resetting, a phenomenon of degradation of the linearity particularly in the low illuminance region is seen, as shown in FIGS. 12A and 12B. However, as explained herein, by causing the diode to operate in the mode A after the start of resetting, a sensor output value with a high S/N ratio and an excellent linearity with respect to illuminance variation can be obtained also even during a period after the start of resetting through the initial stage of the accumulation period.

It should be noted that, though it is most preferable that the potential of the light shielding film LS is set to a constant potential $V_{LS}$ that satisfies $V_{LS} \geq V_{RST.H} + V_{th\_p}$, an effect can be achieved regarding the improvement of properties of the diode D1, even if the constant potential $V_{LS}$ has a value satisfying $V_{LS} \geq V_{RST.H}$. Besides, even if the constant potential $V_{LS}$ has a value that does not satisfy $V_{LS} \geq V_{RST.H}$, an effect can be achieved regarding the improvement of properties of the diode D1, as compared with the case where the potential of the light shielding film LS is floating.

Figure 14:
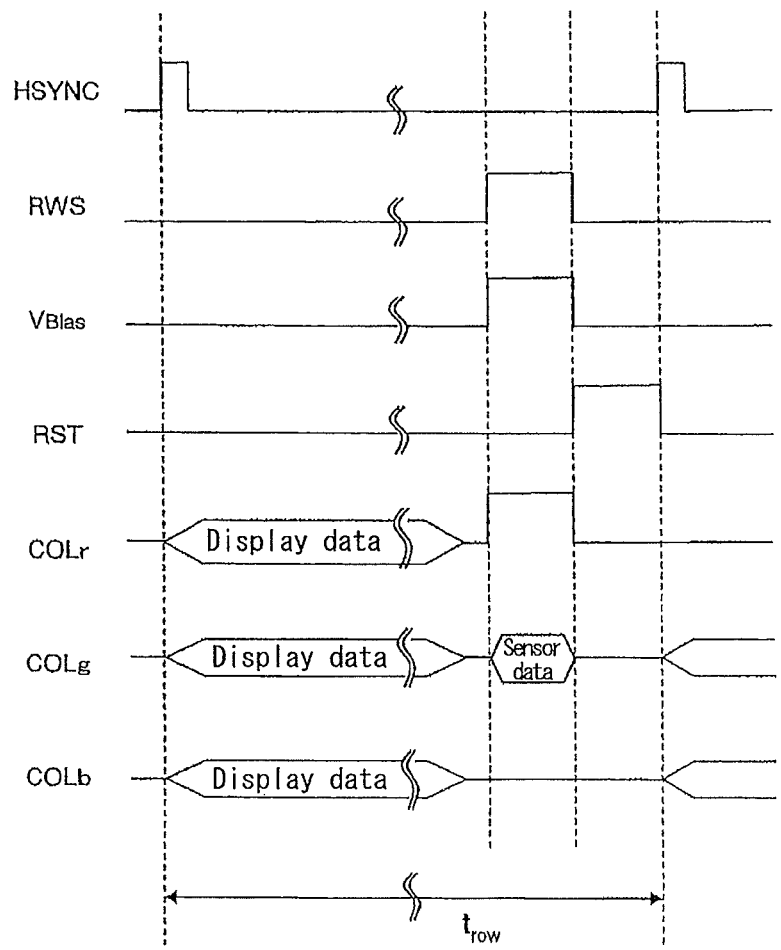
FIG. 14 is a timing chart showing a sensing timing of a display device according to Embodiment 1.

It should be noted that, in the present embodiment, the source lines COLr, COLg, and COLb double as the lines VDD, OUT, and VSS, respectively, for the optical sensor as described above, it is necessary to distinguish the timings at which image data signals for display are input via the source lines COLr, COLg, and COLb from the timing at which sensor outputs are read out, as shown in FIG. 14. In the example shown in FIG. 14, a sensor output is read out by using a horizontal blanking period, after the input of image data for display ends during a horizontal scanning period.

The sensor column driver 4 includes a sensor pixel readout circuit 41, a sensor column amplifier 42, and a sensor column scanning circuit 43, as shown in FIG. 1. To the sensor pixel readout circuit 41, a line SOUT (see FIG. 2) for outputting a sensor output $V_{SOUT}$ from the pixel region 1 is connected. In FIG. 1, a sensor output from a line SOUTj (j=1 to N) is denoted by $V_{SOUTj}$. The sensor pixel readout circuit 41 outputs a peak hold voltage $V_{Sj}$ of the sensor output $V_{SOUTj}$ to the sensor column amplifier 42. The sensor column amplifier 42 incorporates N column amplifiers that correspond to N columns of optical sensors in the pixel region 1, respectively. The sensor column amplifier 42 amplifies the peak hold voltage $V_{Sj}$ (j=1 to N) by each column amplifier, thereby outputting it as $V_{COUT}$ to the buffer amplifier 6. The sensor column scanning circuit 43 outputs a column select signal CSj (j=1 to N) to the sensor column amplifier 42 in order to connect the column amplifiers of the sensor column amplifier 42 sequentially to the output of the buffer amplifier 6.

Figure 15:
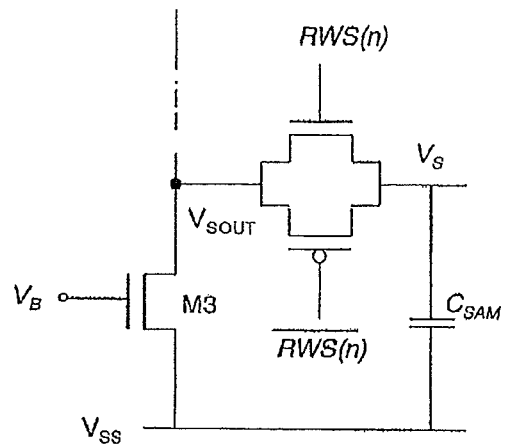
FIG. 15 is a circuit diagram showing an internal configuration of a sensor pixel readout circuit.
Figure 16:
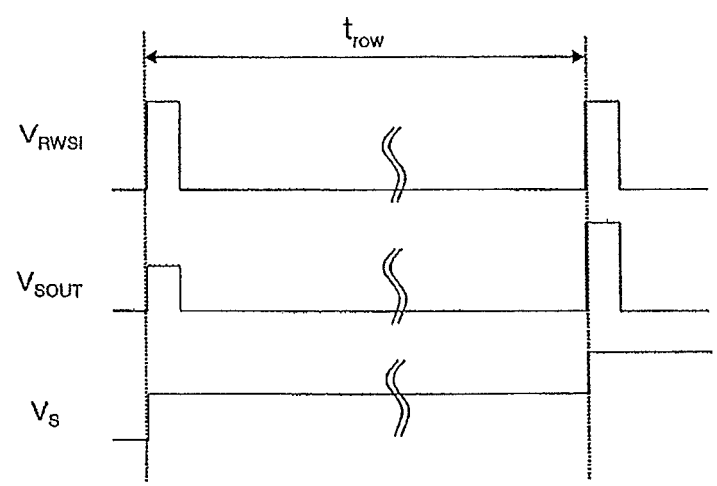
FIG. 16 is a waveform diagram showing the relationship among a readout signal, a sensor output, and an output of a sensor pixel readout circuit.

Here, an operation of the sensor column driver 4 and the buffer amplifier 6 after the sensor output $V_{SOUT}$ is read out from the pixel region 1 is explained below, with reference to FIGS. 15 and 16. FIG. 15 is a circuit diagram illustrating an internal configuration of the sensor pixel readout circuit 41. FIG. 16 is a waveform diagram showing a relationship among the readout signal $V_{RWS}$, the sensor output $V_{SOUT}$, and an output $V_S$ of the sensor pixel readout circuit. As described above, when the readout signal rises to the high level $V_{RWS.H}$, the transistor M2 becomes conductive, whereby the transistors M2 and M3 form a source follower amplifier. This allows the sensor output $V_{SOUT}$ to be accumulated in a sample capacitor $C_{SAM}$ of the sensor pixel readout circuit 41. Therefore, after the readout signal falls to the low level $V_{RWS.L}$, an output voltage $V_S$ from the sensor pixel readout circuit 41 to the sensor column amplifier 42 is maintained at a level equal to a peak value of the sensor output $V_{SOUT}$ during a period ($t_{row}$) while the row concerned is selected, as shown in FIG. 16.

Figure 17:
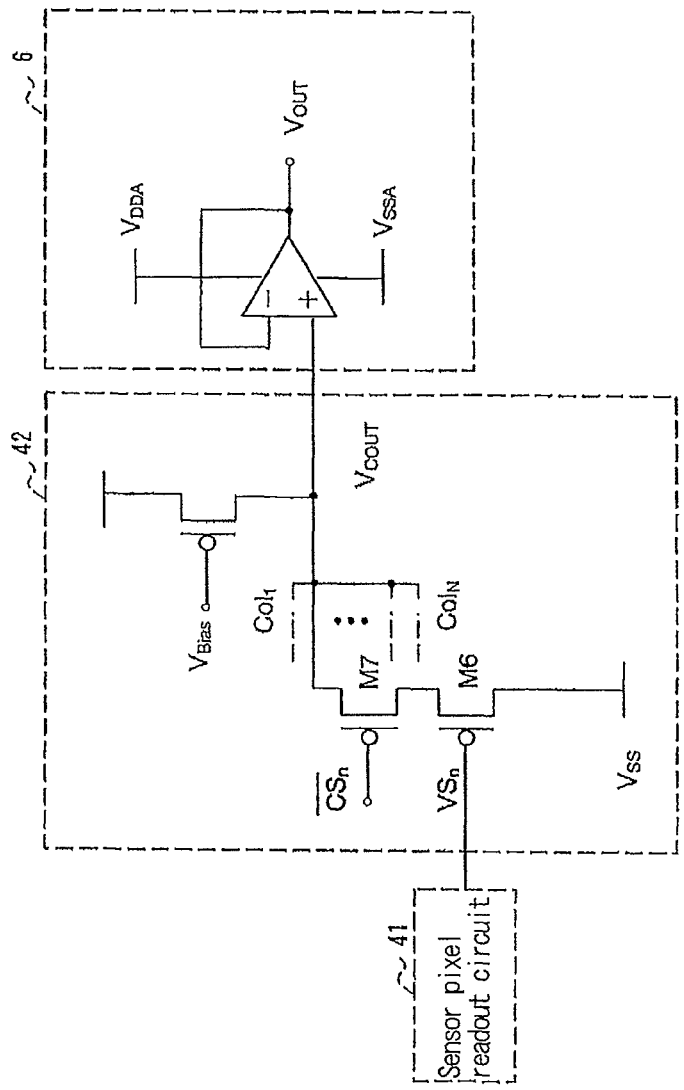
FIG. 17 is an equivalent circuit diagram showing a schematic configuration of a sensor column amplifier.

Next, an operation of the sensor column amplifier 42 is explained below, with reference to FIG. 17. As shown in FIG. 17, the respective output voltages $V_{Sj}$ (j=1 to N) of the columns are input from the sensor pixel readout circuit 41 to the N column amplifiers of the sensor column amplifier 42. As shown in FIG. 17, each column amplifier is composed of transistors M6 and M7. Column select signals CSj generated by the sensor column scanning circuit 43 become ON sequentially with respect to the N columns during a selection period ($t_{row}$) for one row, respectively, so that the transistor M6 of concerned one of the N column amplifiers in the sensor column amplifier 42 is turned on. Then, only concerned one of the output voltages $V_{Sj}$ (j=1 to N) of the columns is output via the transistor M6 concerned, as an output $V_{COUT}$ from the sensor column amplifier 42. The buffer amplifier 6 further amplifies $V_{COUT}$ output from the sensor column amplifier 42, and outputs the same as a panel output (optical sensor signal) $V_{OUT}$ to the signal processing circuit 8.

It should be noted that the sensor column scanning circuit 43 may scan the optical sensor columns one by one as described above, but the configuration is not limited to this. The sensor column scanning circuit 43 may have a configuration for performing interlaced-scanning of columns of the optical sensors. Alternatively, the sensor column scanning circuit 43 may be formed as a scanning circuit of multiphase driving, for example, four-phase driving.

With the above-described configuration, the display device according to the present embodiment obtains a panel output $V_{OUT}$ according to an amount of light received by the photodiode D1 formed in each pixel in the pixel region 1. The panel output $V_{OUT}$ is sent to the signal processing circuit 8, is A/D converted there, and is accumulated in a memory (not shown) as panel output data. This means that the same number of sets of panel output data as the number of pixels (the number of the optical sensors) in the pixel region 1 are accumulated in this memory. The signal processing circuit 8 performs various types of signal processing operations such as image capture and detection of a touched region, using the panel output data accumulated in the memory. It should be noted that in the present embodiment, the same number of sets of panel output data as the number of pixels (the number of optical sensors) in the pixel region 1 are accumulated in the memory of the signal processing circuit 8, but the number of sets of panel output data accumulated therein is not necessarily the same as the number of pixels, with consideration to limitations such as a memory capacity.

It should be noted that, since the wide portion 111 of the line RWS doubles as the gate electrode of the capacitor C1, the configuration according to Embodiment 1 has advantages that contacts (contacts 118, 119 shown in FIG. 24 in conjunction with the description of Embodiment 3) are fewer in number, whereby the size of the optical sensor circuit can be reduced, as compared with Embodiment 3 to be described later. Besides, in the configuration according to Embodiment 1, the wide portion 111 of the line RWS is positioned so as to shield the accumulation node INT from the source line COL. Therefore, this configuration has an advantage of suppressing noise interference to the accumulation node INT from the source line COL as compared with a configuration in which the source line COL is positioned in a layer above the accumulation node INT as is the case with, for example, the configuration of Embodiment 3 to be described later.

Hereinafter, Embodiment 2 of the present invention is explained. The members having the same functions as those of Embodiment 1 explained above are denoted by the same reference numerals as those in Embodiment 1, and detailed explanations of the same are omitted.

Figure 18:
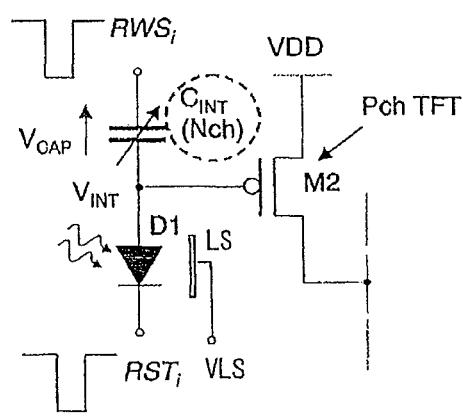
FIG. 18 is an equivalent circuit diagram of an optical sensor according to Embodiment 2.
Figure 19:
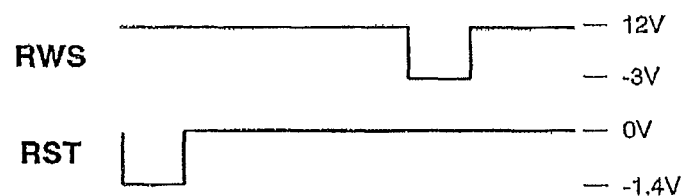
FIG. 19 is a waveform diagram of a reset signal and a readout signal supplied to the optical sensor according to Embodiment 2.
Figure 20:
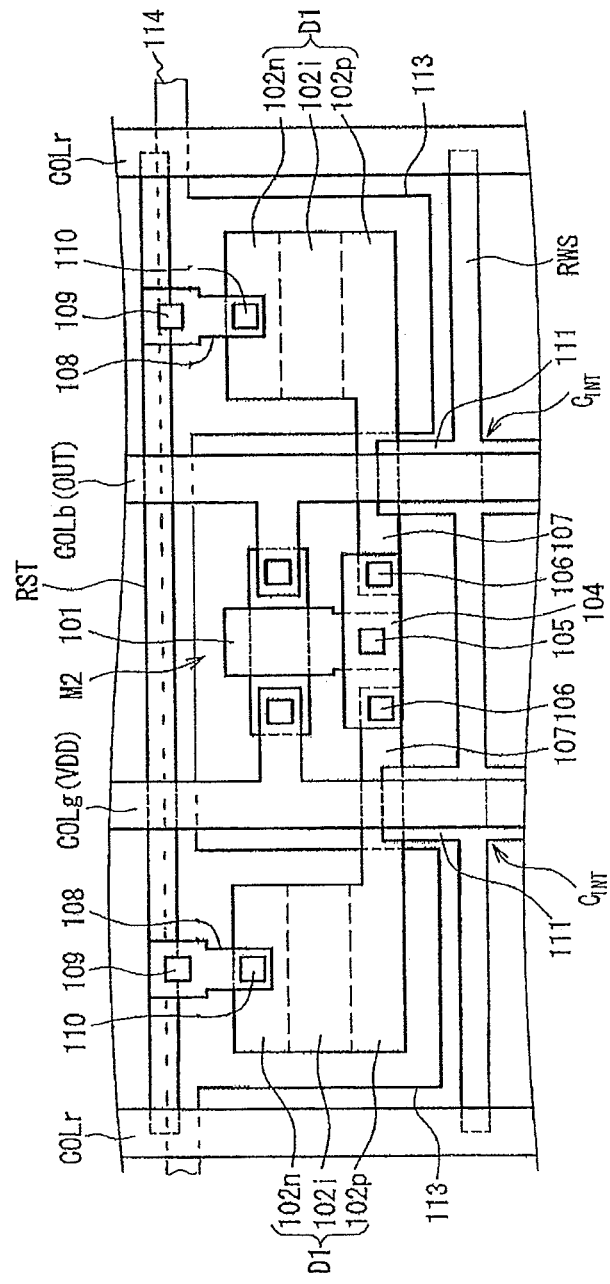
FIG. 20 is a plan view showing an exemplary planar structure of the optical sensor according to Embodiment 2.
Figure 21:
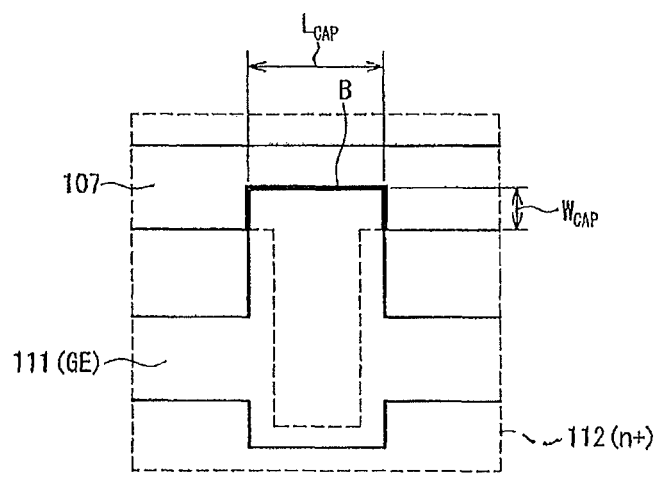
FIG. 21 is an enlarged view of a region shown in FIG. 20 where a capacitor C1 is formed.
Figure 22:
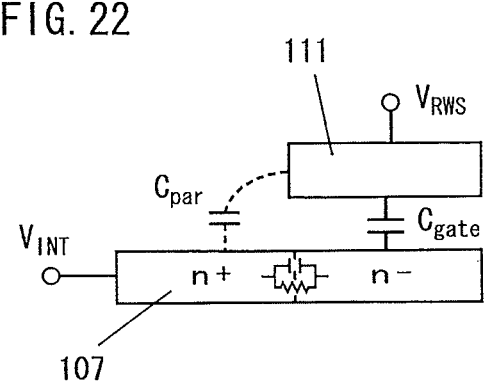
FIG. 22 is a schematic cross-sectional view showing a connection relationship of respective regions in the optical sensor according to Embodiment 2.

FIG. 18 is an equivalent circuit diagram of an optical sensor according to the present embodiment. FIG. 19 is a waveform diagram of a reset signal and a readout signal supplied to the optical sensor according to the present embodiment. FIG. 20 is a plan view showing an exemplary planar structure of the optical sensor according to the present embodiment. FIG. 21 is an enlarged view of a region where a capacitor C1 is formed. FIG. 22 is a schematic cross-sectional view showing a connection relationship of respective regions in the optical sensor according to the present embodiment.

As shown in FIG. 18, the optical sensor according to the present embodiment differs from that of Embodiment 1 in that the capacitance C1 is an n-channel MOS capacitor. Besides, the diode D1 is connected in a reverse direction as compared with Embodiment 1. More specifically, the cathode of the diode D1 is connected to the line RST, and the anode thereof is connected to the accumulation node INT. Still further, the transistor M2 for readout is a p-channel TFT. Still further, as shown in FIG. 19, the potentials of the reset signal and the readout signal assume the high levels and the low levels in a reversed manner as compared with Embodiment 1.

As shown in FIG. 20, the diode D1 is a lateral-structure PIN diode in which a p-type semiconductor region $102p$, an i-type semiconductor region $102i$, and an n-type semiconductor region $102n$ are formed in series on a silicon film as a base, as is the case with Embodiment 1. However, the n-type semiconductor region $102n$ (cathode) is connected to the line RST via the line 108 and the contacts 109 and 110. The p-type semiconductor region $102p$ (anode) is connected to the gate electrode 101 of the transistor M2 via the extended portion 107 of the silicon film, the contacts 105 and 106, and the line 104.

As shown in FIGS. 21 and 22, a capacitor C1 is formed with a wide portion 111 formed in the line RWS, the extended portion 107 of the silicon film, and an insulation film (not shown) provided between the wide portion 111 and the extended portion 107. In other words, the wide portion 111 having the same potential as that of the line RWS functions as a gate electrode of the capacitor C1. In the present embodiment, the region 112 shown in FIG. 21 is an n+ region formed by doping an n-type impurity such as phosphorus into an n-type silicon film. It should be noted that when the n-type impurity is doped, the wide portion 111 functions as a mask. Therefore, as shown in FIG. 22, the extended portion 107 becomes the n+ region, and a portion of the silicon film below the wide portion 111 forms an n− region.

In the optical sensor of the present embodiment having the above-described configuration, the potential relationship is reversed as compared with Embodiment 1. Therefore, the potential variation of the accumulation node INT during the integration period and the readout period assumes a state obtained by vertically revering the state shown in FIG. 9 in conjunction with the description of Embodiment 1. Therefore, in the optical sensor of the present embodiment also, the accumulation node potential difference due to the difference in the illuminance of the light receiving surface after the boosting is greater than that at the end of the integration period. For example, a difference between the potential of the accumulation node after the boosting during the readout period in the case of a dark state and the potential of the accumulation node after the boosting during the readout period in the case where light at a saturation level is incident is greater than a difference between the potential of the accumulation node at the end of the accumulation period in the case of a dark state and the potential of the accumulation node at the end of the accumulation period in the case where light at a saturation level is incident. As a result, an optical sensor having a high sensitivity and a high S/N ratio can be realized.

Besides, with the optical sensor of the present embodiment as well, an optical sensor output having excellent linearity with respect to illuminance variation can be obtained, as is the case with Embodiment 1, by fixing the potential of the light shielding film LS of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 3 of the present invention is explained. The members having the same functions as those of the embodiments explained above are denoted by the same reference numerals as those in the above-described embodiments, and detailed explanations of the same are omitted.

Figure 23:
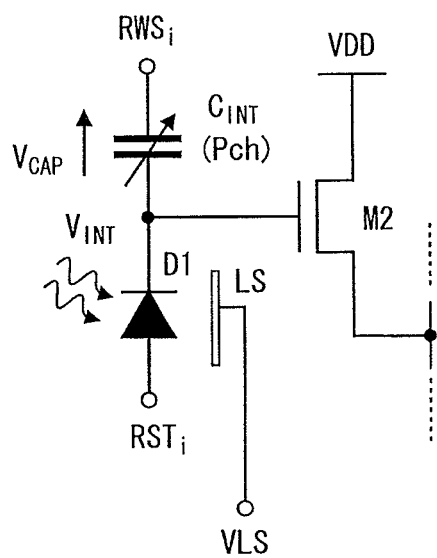
FIG. 23 is an equivalent circuit diagram of an optical sensor according to Embodiment 3.
Figure 24:
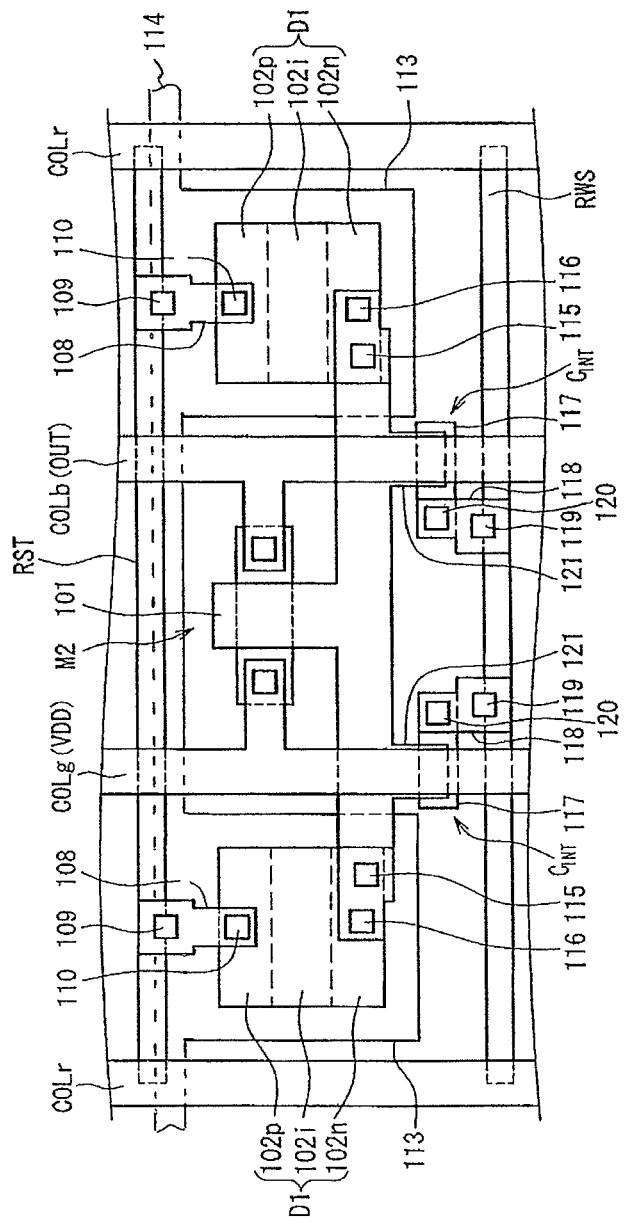
FIG. 24 is a plan view showing an exemplary planar structure of the optical sensor according to Embodiment 3.
Figure 25:
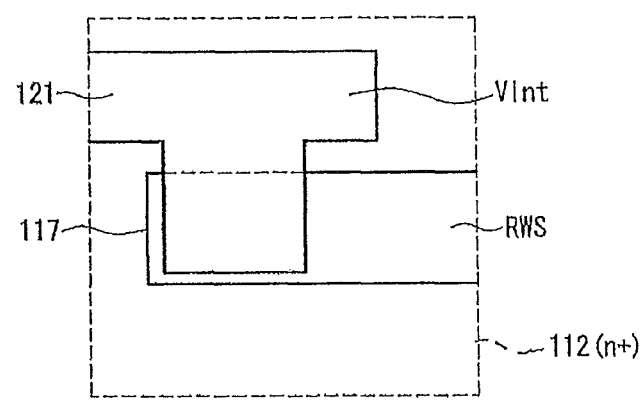
FIG. 25 is an enlarged view of a region shown in FIG. 24 in which a capacitor C1 is formed.
Figure 26:
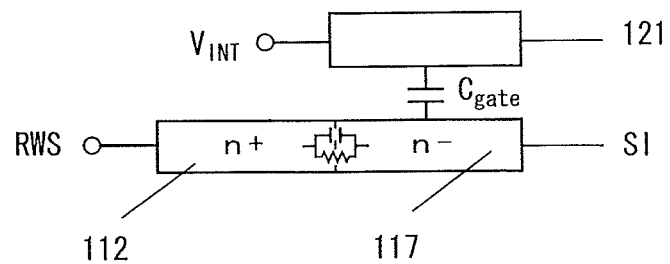
FIG. 26 is a schematic cross-sectional view showing a connection relationship of respective regions in the optical sensor according to Embodiment 3.

FIG. 23 is an equivalent circuit diagram of an optical sensor according to the present embodiment. FIG. 24 is a plan view showing an exemplary planar structure of the optical sensor according to the present embodiment. FIG. 25 is an enlarged view of a region in which a capacitor C1 is formed. FIG. 26 is a schematic cross-sectional view showing a connection relationship of respective regions in the optical sensor according to the present embodiment.

As shown in FIG. 23, the equivalent circuit diagram of an optical sensor according to the present embodiment is identical to that of Embodiment 1. The configuration of the capacitor 1, etc., however, are different, as shown in FIGS. 24 to 26.

As shown in FIG. 24, in the optical sensor according to the present embodiment, the line from the gate electrode 101 of the transistor M2 is extended to above the n-type semiconductor region 102n of the diode D1, and is connected to the n-type semiconductor region 102n via the contacts 115 and 116. The line from the gate electrode 101 of the transistor M2 is extended also to an upper layer of the capacitor C1, and functions as a gate electrode 121 of the capacitor C1.

As shown in FIGS. 25 and 26, the capacitor C1 is formed with the gate electrode 121, a silicon film 117, and an insulation film (not shown) between the gate electrode 121 and the silicon film 117. The gate electrode 121 has the same potential ($V_{INT}$) as that of the accumulation node INT. In the present embodiment, a region 112 shown in FIG. 25 is an n+ region formed by doping an n-type impurity such as phosphorus into an n-type silicon film. It should be noted that when the n-type impurity is doped, the gate electrode 121 functions as a mask. Therefore, as shown in FIG. 26, a portion of the silicon film below the gate electrode 121 forms an n− region.

The optical sensor of the present embodiment is driven by the reset signal and the readout signal shown in FIG. 4 in conjunction with the description of Embodiment 1, the potential variation of the accumulation node INT during the integration period and the readout period is as shown in FIG. 9 in conjunction with the description of Embodiment 1. Therefore, in the optical sensor of the present embodiment also, the accumulation node potential difference due to the difference in the illuminance of the light receiving surface after the boosting is greater than that at the end of the integration period. For example, a difference between the potential of the accumulation node after the boosting during the readout period in the case of a dark state and the potential of the accumulation node after the boosting during the readout period in the case where light at a saturation level is incident is greater than a difference between the potential of the accumulation node at the end of the accumulation period in the case of a dark state and the potential of the accumulation node at the end of the accumulation period in the case where light at a saturation level is incident. As a result, an optical sensor having a high sensitivity and a high S/N ratio can be realized.

Besides, with the optical sensor of the present embodiment as well, an optical sensor output having excellent linearity with respect to illuminance variation can be obtained, as is the case with Embodiment 1, by fixing the potential of the light shielding film LS of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 4 of the present invention is explained. The members having the same functions as those of the embodiments explained above are denoted by the same reference numerals as those in the above-described embodiments, and detailed explanations of the same are omitted.

Figure 27:
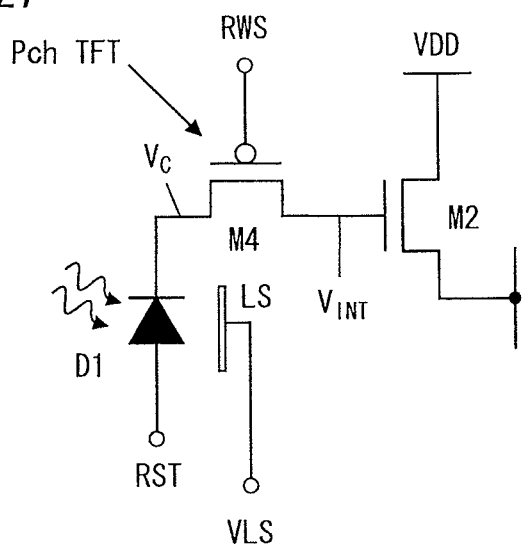
FIG. 27 is an equivalent circuit diagram of an optical sensor according to Embodiment 4.
Figure 28:
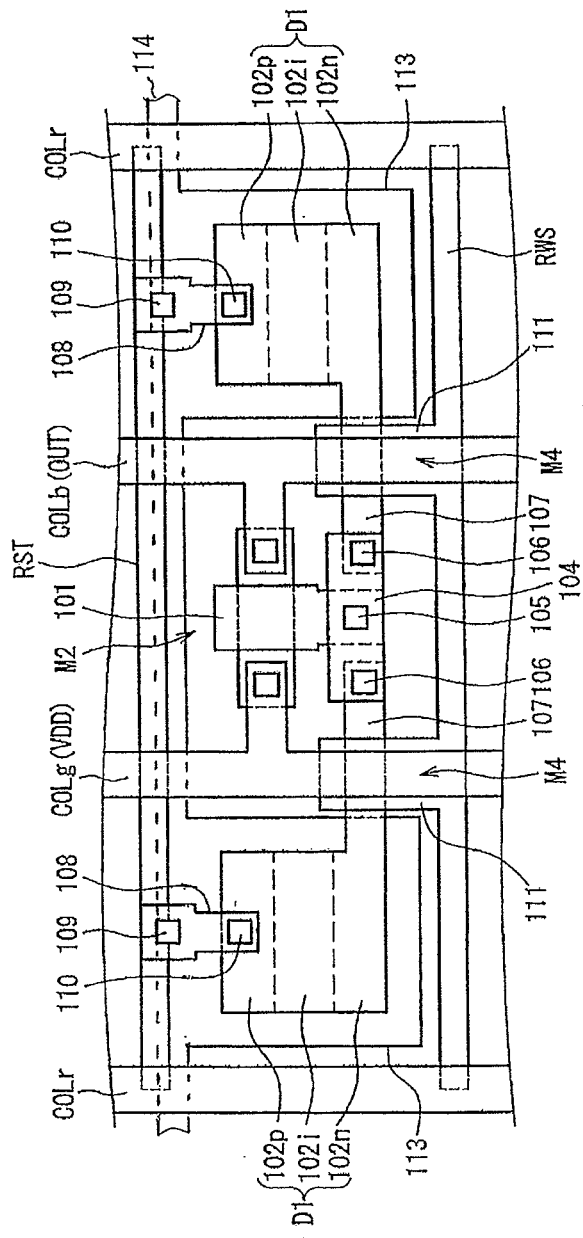
FIG. 28 is a plan view showing an exemplary planar structure of the optical sensor according to Embodiment 4.
Figure 29:
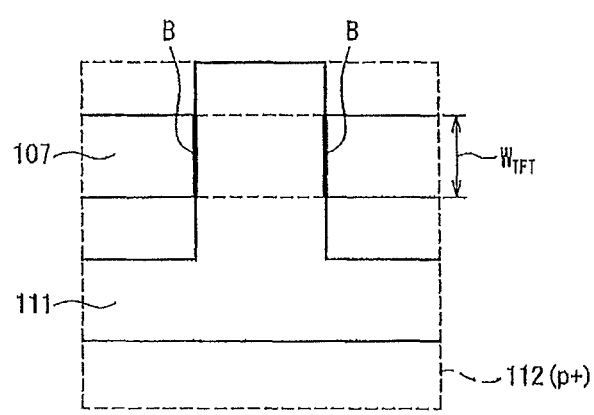
FIG. 29 is an enlarged view of a region shown in FIG. 28 where a p-channel TFT is formed.
Figure 30:
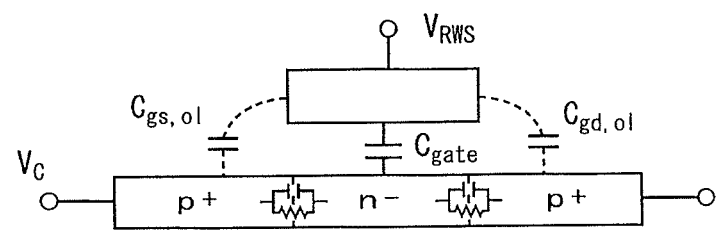
FIG. 30 is a schematic cross-sectional view showing a connection relationship of respective regions in the optical sensor according to Embodiment 4.
Figure 31:
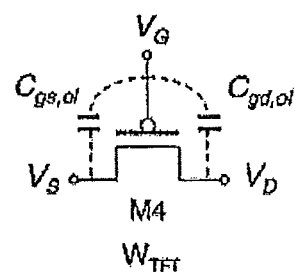
FIG. 31 is an equivalent circuit diagram of a p-channel TFT of the optical sensor according to Embodiment 4.

FIG. 27 is an equivalent circuit diagram of an optical sensor according to the present embodiment. FIG. 28 is a plan view showing an exemplary planar structure of the optical sensor according to the present embodiment. FIG. 29 is an enlarged view of a region where an amplifying element (p-channel TFT) is formed. FIG. 30 is a schematic cross-sectional view showing a connection relationship of respective regions in the optical sensor according to the present embodiment. FIG. 31 is an equivalent circuit diagram of a p-channel nil as an amplifying element.

The optical sensor according to the present embodiment, as shown in FIGS. 27 to 31, employs a p-channel TFT (transistor M4) as an amplifying element, in place of the variable capacitor C1 in Embodiments 1 to 3 explained above. It should be noted that the driving signals and operations of the optical sensor of the present embodiment in which the transistor M4 is used as an amplifying element are identical to those in Embodiment 1 explained above with reference to FIGS. 4 to 9. Therefore, with the optical sensor according to the present embodiment as well, the potential $V_{INT}$ of the accumulation node can be read out in an amplified state.

Further, as shown in FIGS. 28 and 29, the optical sensor according to the present embodiment differs from Embodiment 1 in that the wide portion 111 of the line RWS is extended to such a position as to cross over the line 107 entirely in the width direction. With this configuration, the optical sensor according to the present embodiment has an advantage of a shorter boundary length than that in the optical sensor according to Embodiment 1.

Hereinafter, the boundary length is explained. The boundary length means a length of a boundary between the amplifying element and the accumulation node INT. For example, in Embodiment 1, as shown in FIGS. 6 and 7, the capacitor C1 is formed with a portion where the extended portion 107 of the silicon film and the wide portion 111 of the line RWS overlap. Therefore, in Embodiment 1, as shown in FIG. 7, the boundary line between the amplifying element and the accumulation node INT is a portion where an outer edge of the wide portion 111 of the line RWS overlaps the extended portion 107 of the silicon film, which is indicated by a thick line B. In other words, in Embodiment 1, the boundary length is a sum of a length of $L_{CAP}$ and $2 \times W_{CAP}$ shown in FIG. 7. In the optical sensor according to the present embodiment, since a portion where the wide portion 111 of the line RWS and the extended portion 107 of the silicon film overlap as shown in FIG. 29 functions as an amplifying element, the boundary length is twice the width $W_{TFT}$ of this amplifying element (i.e., the width of the extended portion 107).

In Embodiment 1, in order to decrease the boundary length, the length of $L_{CAP}$ has to be decreased, whereas if the capacitance of the capacitor C1 is increased, a layout area of the capacitor C1 ends up increasing. However, in Embodiment 4, the boundary length is equal to the width $W_{TFT}$ of the extended portion 107 of the silicon film. Therefore, the boundary length can be decreased, without an increase in the layout area.

Figure 32:
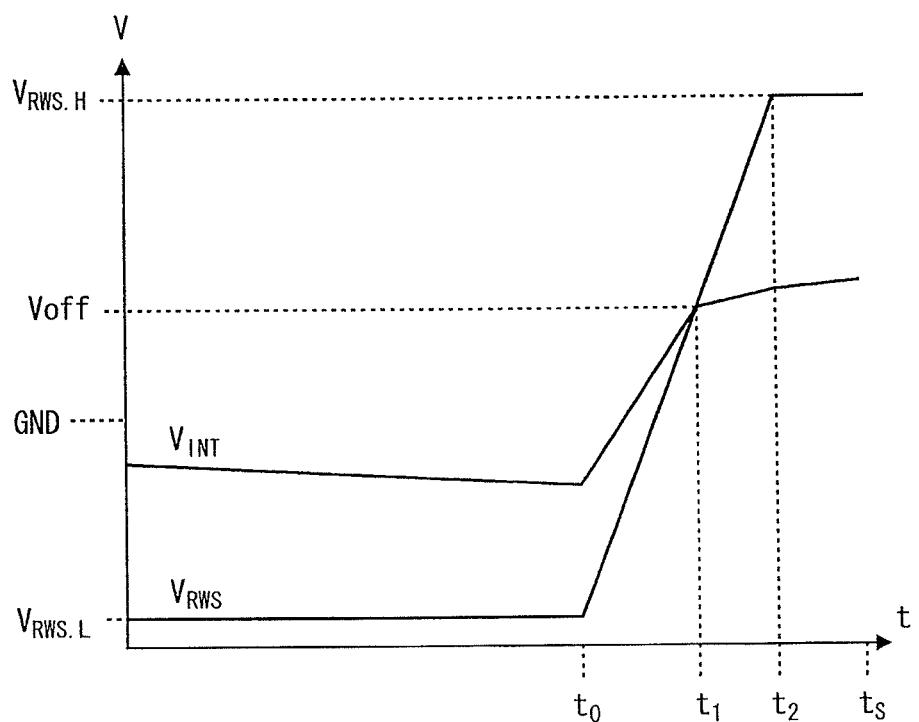
FIG. 32 is a waveform diagram showing influences that are given to a potential of an accumulation node by a parasitic capacitance and a leakage current.

The reason why a shorter boundary length is preferred is explained below with reference to FIGS. 9 and 32. As explained in the description of Embodiment 1 with reference to FIG. 9, the threshold voltage $V_{off}$ is a voltage at a certain level via which the readout signal supplied from the line RWS rises from the low level potential $V_{RWS.L}$ to the high level potential $V_{RWS.H}$. Here, after the readout signal of the line RWS reaches the threshold voltage $V_{off}$ at a time $t_1$, the potential $V_{INT}$ of the accumulation node is preferably constant until a sampling time $t_S$. However, as shown in FIG. 32, during a period from the time $t_1$ to a time $t_2$ while the readout signal is rising, the potential $V_{INT}$ of the accumulation node continuously rises, due to a parasitic capacitance between the amplifying element and the accumulation node. During a period from the time $t_2$ at which the potential of the readout signal reaches the high-level potential $V_{RWS.H}$ to the sampling time $t_S$ as well, the potential $V_{INT}$ of the accumulation node continuously rises, due to a leakage current. Such rising of the potential $V_{INT}$ of the accumulation node after the time $t_1$ in this way is not preferable since an effect of potential amplification decreases. In order to suppress the rise of the potential $V_{INT}$ due to the parasitic capacitance and the leakage current after the time $t_1$, the boundary length of the amplifying element is preferably short.

Therefore, the optical sensor according to Embodiment 4, which is characterized in the shorter boundary length of the amplifying element, is capable of suppressing the rise of the potential $V_{INT}$ due to the parasitic capacitance and the leakage current after the time $t_1$. Thus, the optical sensor according to the present embodiment is more advantageous than the optical sensor according to Embodiment 1.

Figure 33:
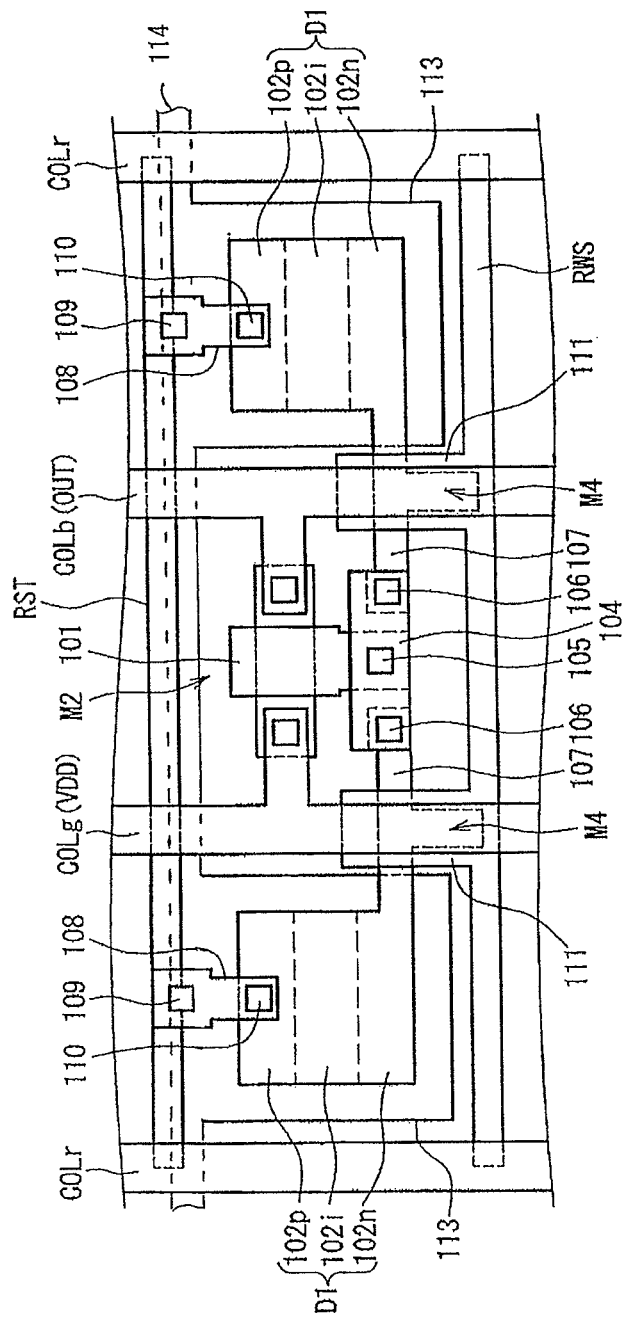
FIG. 33 is a plan view showing an exemplary planar structure of an exemplary modification of the optical sensor according to Embodiment 4.
Figure 34:
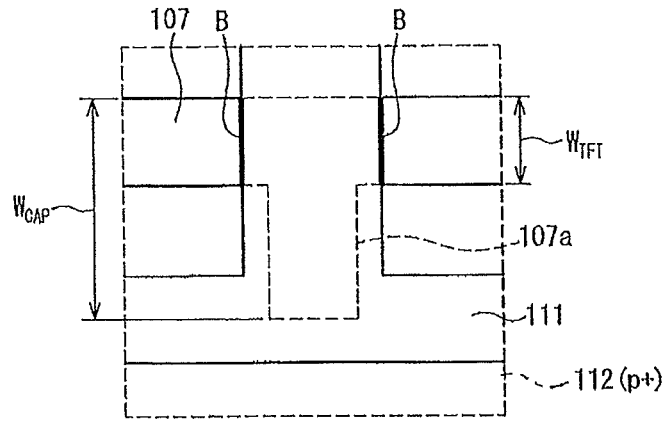
FIG. 34 is an enlarged view of a region shown in FIG. 33 where a p-channel TFT is formed.
Figure 35:
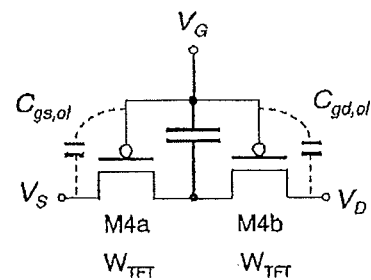
FIG. 35 is an equivalent circuit diagram of a p-channel TFT shown in FIG. 33.

Besides, as an exemplary modification of the optical sensor according to Embodiment 4, a configuration in which the amplifying element has a sufficient effective area and the boundary length $W_{TFT}$ is shortened further can be provided by narrowing the extended portion 107 of the silicon film in width, and providing a wide portion 107a in the extended portion 107 so that the amplifying element has a sufficient width $W_{CAP}$, as shown in FIGS. 33 and 34. In this case, an equivalent circuit diagram of the p-channel TFT as an amplifying element is as shown in FIG. 35. According to the configuration of this exemplary modification, the boundary length can be shortened further, as compared with the configuration shown in FIGS. 27 to 31. Therefore, the rise of the potential $V_{INT}$ due to the parasitic capacitance and the leakage current after the time $t_1$ can be suppressed further. Consequently, an optical sensor having a further greater dynamic range can be realized.

Still further, with the optical sensor of the present embodiment also, an optical sensor output having excellent linearity with respect to illuminance variation can be obtained, as is the case with Embodiment 1, by fixing the potential of the light shielding film LS of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 5 of the present invention is explained. The members having the same functions as those of the embodiments explained above are denoted by the same reference numerals as those in the above-described embodiments, and detailed explanations of the same are omitted.

Figure 36:
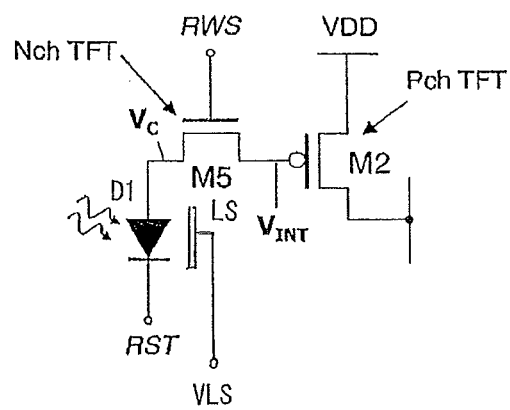
FIG. 36 is an equivalent circuit diagram of an optical sensor according to Embodiment 5.
Figure 37:
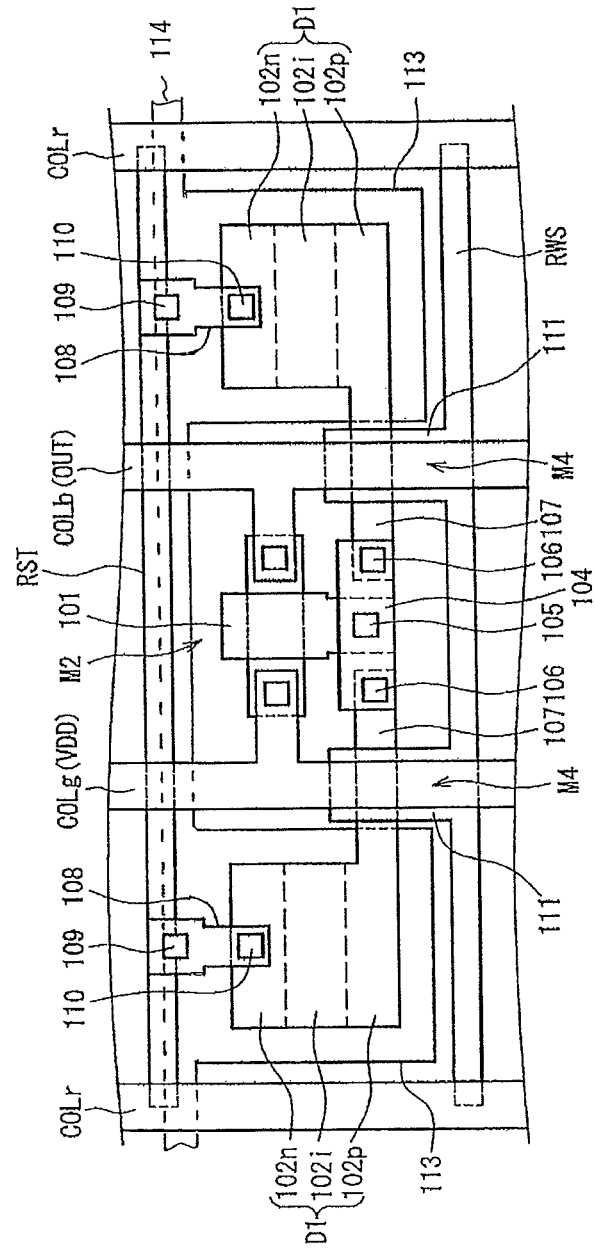
FIG. 37 is a plan view showing an exemplary planar structure of the optical sensor according to Embodiment 5.
Figure 38:
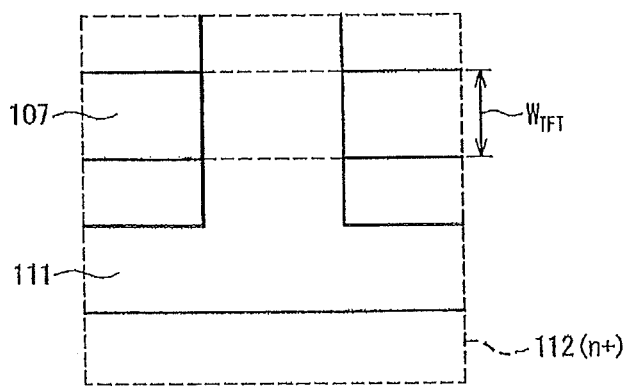
FIG. 38 is an enlarged view of a region where an amplifying element (n-channel TFT) is formed in Embodiment 5.
Figure 39:
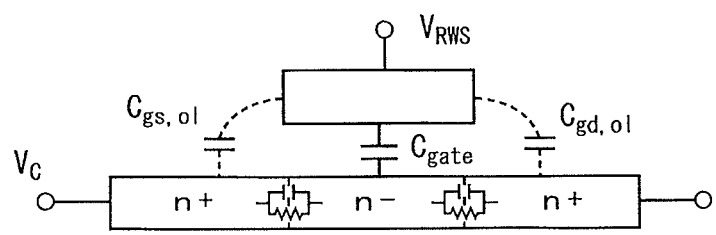
FIG. 39 is a schematic cross-sectional view showing a connection relationship of respective regions in the optical sensor according to Embodiment 5.
Figure 40:
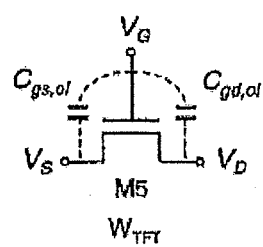
FIG. 40 is an equivalent circuit diagram of an n-channel TFT as an amplifying element in Embodiment 5.

FIG. 36 is an equivalent circuit diagram of an optical sensor according to the present embodiment. FIG. 37 is a plan view showing an exemplary planar structure of the optical sensor according to the present embodiment. FIG. 38 is an enlarged view of a region where an amplifying element (n-channel TFT) is formed FIG. 39 is a schematic cross-sectional view showing a connection relationship of respective regions in the optical sensor according to the present embodiment. FIG. 40 is an equivalent circuit diagram of an n-channel TFT as an amplifying element.

The optical sensor of the present embodiment employs an n-channel TFT (transistor M4) as an amplifying element, in place of the n-channel MOS capacitor in Embodiment 2 explained above. It should be noted that the driving signals for the optical sensor of the present embodiment in which the n-channel TFT is used as the amplifying element assume the high level potential and the low level potential in a reversed manner as compared with the driving signals of Embodiment 4 in which the n-channel TFT is used as an amplifying element, as described in the description of Embodiment 2 with reference to FIG. 19. With these driving signals, the optical sensor of the present embodiment is characterized in that the potential $V_{INT}$ of the accumulation node can be read out in an amplified state, as explained above in the description of Embodiment 1 with reference to FIG. 19.

As shown in FIGS. 36 and 37, in the optical sensor according to the present embodiment, the diode D1 is connected in a reverse direction as compared with Embodiment 4. More specifically, the cathode of the diode D1 is connected to the line RST, and the anode thereof is connected to the n-channel TFT. Still further, the transistor M2 for readout is a p-channel TFT.

As shown in FIGS. 37 and 38, the optical sensor according to the present embodiment differs from Embodiment 2 in that the wide portion 111 of the line RWS is extended to such a position as to cross over the line 107 entirely the width direction. The optical sensor according to the present embodiment has an advantage of a shorter boundary length than that in the optical sensor according to Embodiment 2, as explained in comparison with Embodiment 1 in the description of Embodiment 4. More specifically, the boundary length of the optical sensor according to Embodiment 2 is $L_{CAP}+2 \times W_{CAP}$ as shown in FIG. 21. On the other hand, the boundary length of the optical sensor according to the present embodiment is equal to the width $W_{TST}$ of the extended portion 107 as shown in FIG. 38.

In Embodiment 2, in order to decrease the boundary length, the length of $L_{CAP}$ has to be decreased, whereas if the capacitance of the capacitor C1 is ensured, a layout area of the capacitor C1 ends up increasing. However, in the present embodiment, the boundary length is equal to twice the width $W_{TFT}$ of the extended portion 107 of the silicon film. Therefore, the boundary length can be decreased, without an increase in the layout area. Thus, the optical sensor according to the present embodiment, which is characterized in the shorter boundary length of the amplifying element, is capable of suppressing the rising of the potential $V_{INT}$ due to a parasitic capacitance and a leakage current after the time $t_1$. Therefore, the optical sensor according to the present embodiment is more advantageous than the optical sensor according to Embodiment 2.

Figure 41:
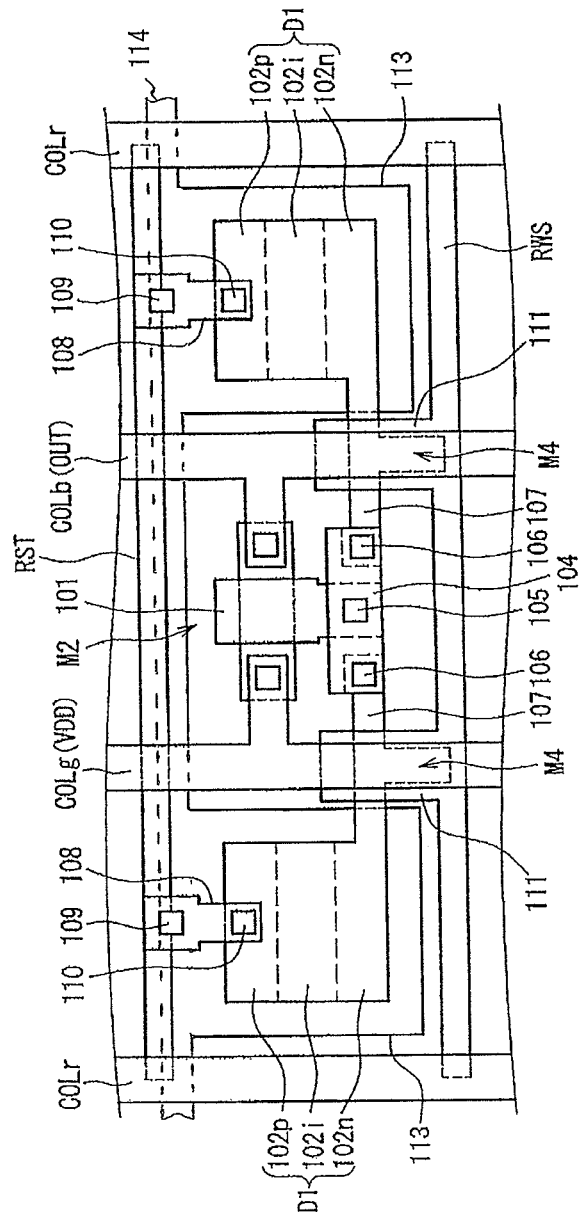
FIG. 41 is a plan view showing an exemplary planar structure of an exemplary modification of the optical sensor according to Embodiment 5.
Figure 42:
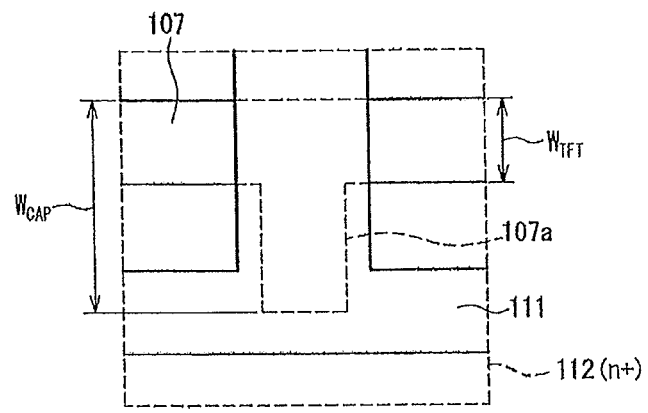
FIG. 42 is a schematic cross-sectional view showing a connection relationship of respective regions in an amplifying element in the exemplary modification shown in FIG. 41.
Figure 43:
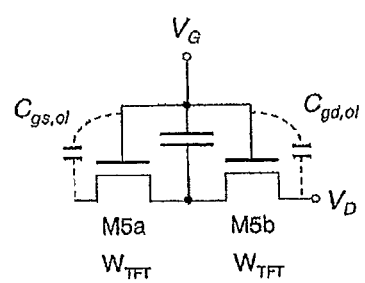
FIG. 43 is an equivalent circuit diagram of an n-channel TFT shown in FIG. 42.

Besides, as an exemplary modification of the optical sensor according to Embodiment 5, a configuration in which the amplifying element has a sufficient effective area and the boundary length $W_{TFT}$ is shortened further without an increase in the layout area can be provided by narrowing the extended portion 107 of the silicon film in width, and providing a wide portion 107a in the extended portion 107, as shown in FIGS. 41 and 42. In this case, an equivalent circuit diagram of the n-channel TFT as an amplifying element is as shown in FIG. 43. According to the configuration of this exemplary modification, the boundary length can be shortened further, as compared with the configuration shown in FIGS. 36 to 40. Therefore, the rise of the potential $V_{INT}$ due to the parasitic capacitance and the leakage current after the time $t_1$ can be suppressed further. Consequently, an optical sensor having a further greater dynamic range can be realized.

Still further, with the optical sensor of the present embodiment also, an optical sensor output having excellent linearity with respect to illuminance variation can be obtained, as is the case with Embodiment 1, by fixing the potential of the light shielding film LS of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 6 of the present invention is explained. The members having the same functions as those of the embodiments explained above are denoted by the same reference numerals as those in the above-described embodiments, and detailed explanations of the same are omitted.

Figure 44:
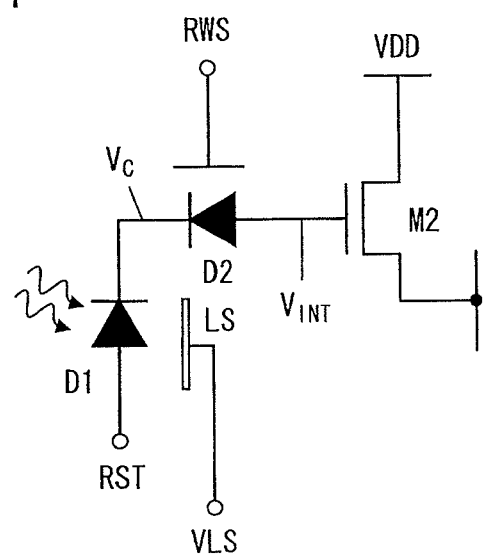
FIG. 44 is an equivalent circuit diagram of an optical sensor according to Embodiment 6.
Figure 45:
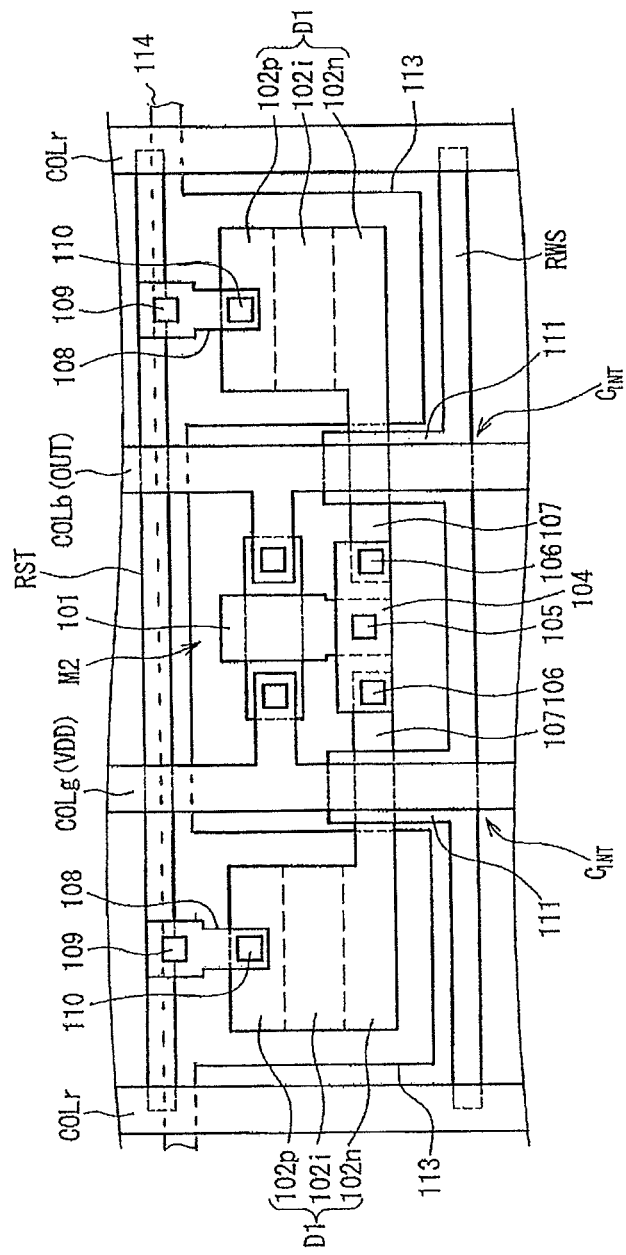
FIG. 45 is a plan view showing an exemplary planar structure of the optical sensor according to Embodiment 6.
Figure 46:
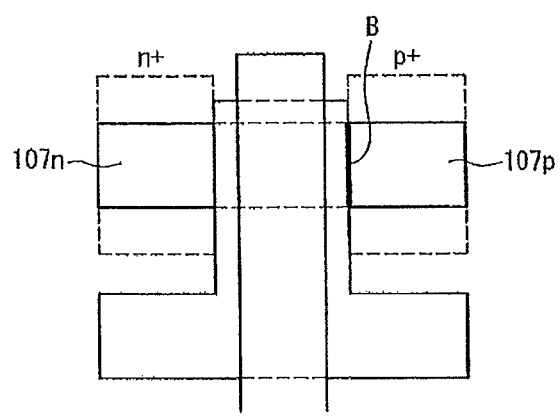
FIG. 46 is an enlarged view of a region where an amplifying element (diode D2) is formed in Embodiment 6.
Figure 47:
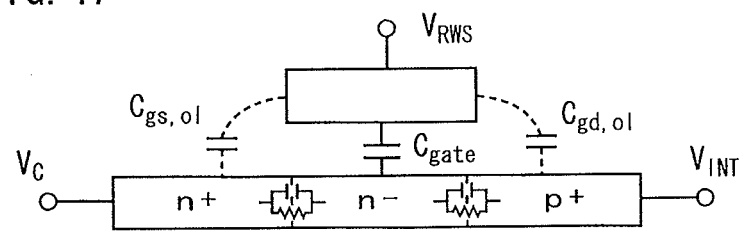
FIG. 47 is a schematic cross-sectional view showing a connection relationship of respective regions in the optical sensor according to Embodiment 6.
Figure 48:
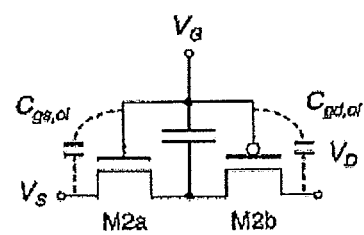
FIG. 48 is an equivalent circuit diagram of a diode as an amplifying element according to Embodiment 6.

FIG. 44 is an equivalent circuit diagram of an optical sensor according to the present embodiment. FIG. 45 is a plan view showing an exemplary planar structure of the optical sensor according to the present embodiment. FIG. 46 is an enlarged view of a region where an amplifying element (diode D2) is formed. FIG. 47 is a schematic cross-sectional view showing a connection relationship of respective regions in the optical sensor according to the present embodiment. FIG. 48 is an equivalent circuit diagram of a diode as an amplifying element.

The optical sensor according to the present embodiment differs from the above-described embodiments in that a diode D2 is used as an amplifying element. It should be noted that the diode D2 used herein is a diode having a gate electrode on a channel. The diode D2, as having the gate electrode on a channel region, performs boosting during the readout period using a capacitance between the gate and the diode. As shown in FIG. 44, the optical sensor according to the present embodiment includes the diode D2 functioning as an amplifying element. As shown in FIGS. 44 to 46, a cathode (n-type semiconductor region 107n) of the diode D2 is connected to a cathode (n-type semiconductor region 102n) of the diode D1, and an anode (p-type semiconductor region 107p) of the diode D2 is connected to the accumulation node INT.

In this configuration also, the potential $V_{INT}$ of the accumulation node can be read out in an amplified state as shown in FIG. 9 in conjunction with the description of Embodiment 1, with the reset signal and the readout signal shown in FIG. 4 in conjunction with the description of Embodiment 1.

Further, the configuration according to the present embodiment has the following two advantages as compared with a configuration in which a p-channel TFT is used as an amplifying element as in Embodiment 4.

The first advantage is that the boundary length is further shorter. More specifically, in the optical sensor according to the present embodiment, as shown in FIG. 46, a boundary B is present only on the p+ region side. Therefore, the boundary length is equal to the width $W_{TFT}$ of the extended portion 107 of the silicon film. Thus, the optical sensor of the present embodiment is more advantageous than the optical sensor of Embodiment 4 in that the rise in the potential $V_{INT}$ due to the parasitic capacitance and the leakage current after the time $t_1$ can be suppressed further.

The second advantage is that, since the cathode (n-type semiconductor region 102n) of the diode D1 and the cathode (n-type semiconductor region 107n) of the diode D2 are connected, the connection is easier as compared with Embodiment 4 in which the cathode (n-type semiconductor region 102) of the diode D1 is connected with the p-type semiconductor region.

Figure 49:
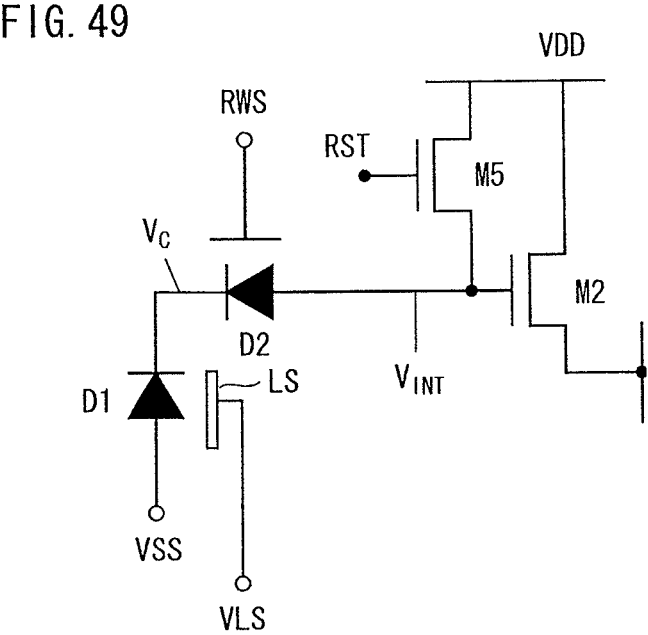
FIG. 49 is an equivalent circuit diagram of an optical sensor according to a first exemplary modification of Embodiment 6.
Figure 50:
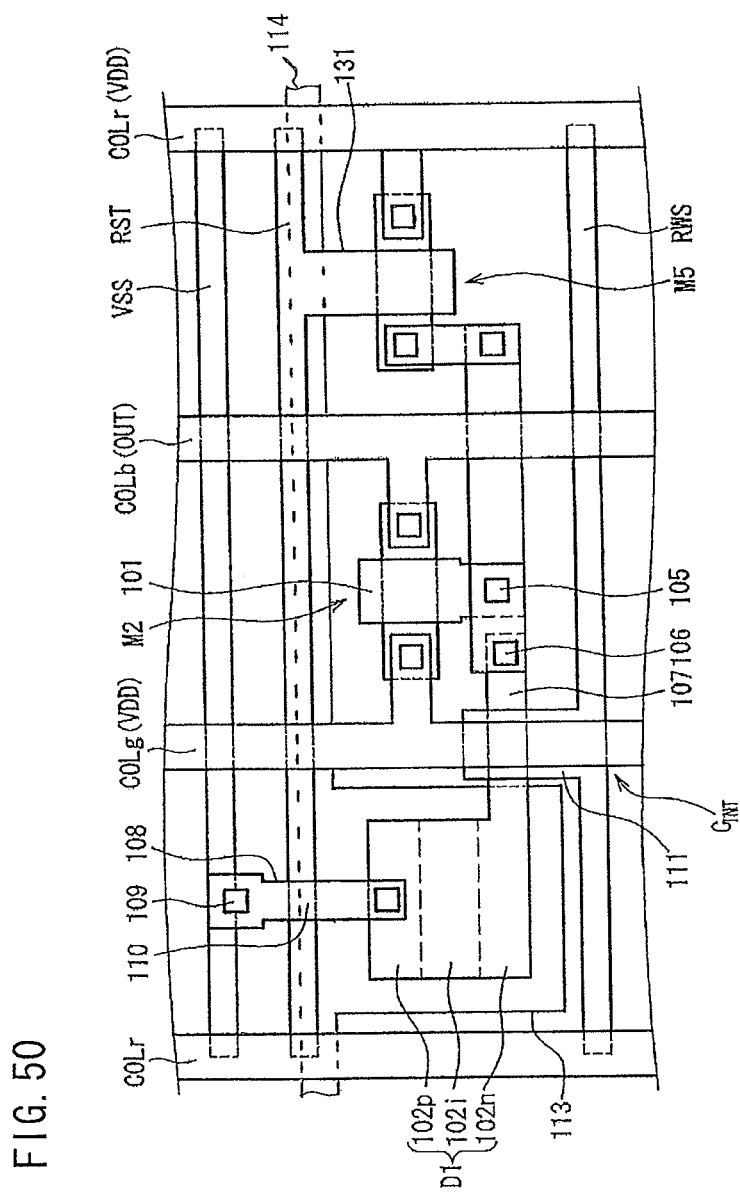
FIG. 50 is a plan view showing an exemplary planar structure of the optical sensor according to the first exemplary modification of Embodiment 6.

It should be noted that a configuration shown in FIGS. 49 and 50 may be adopted as an exemplary modification of the configuration shown in FIGS. 44 and 45. FIG. 49 is an equivalent circuit diagram of an optical sensor according to a first exemplary modification of the present embodiment. FIG. 50 is a plan view showing an exemplary planar structure of the optical sensor according to the first exemplary modification. As shown in FIGS. 49 and 50, the optical sensor according to the first exemplary modification of the present embodiment has a configuration in which a transistor M5 for resetting is added.

The anode (p-type semiconductor region 102p) of the diode D1 is connected to the line VSS for supplying a predetermined DC potential via the line 108 and the contacts 109 and 110. A gate electrode 131 of the transistor M3 for resetting is extended from the line RST. This configuration of the first exemplary modification has an advantage of being capable of resetting the accumulation node more surely with use of the transistor M3 for resetting that is connected to the accumulation node, as compared with the configuration shown in FIGS. 44 and 45 in which the resetting is carried out via the diode D2.

Figure 51:
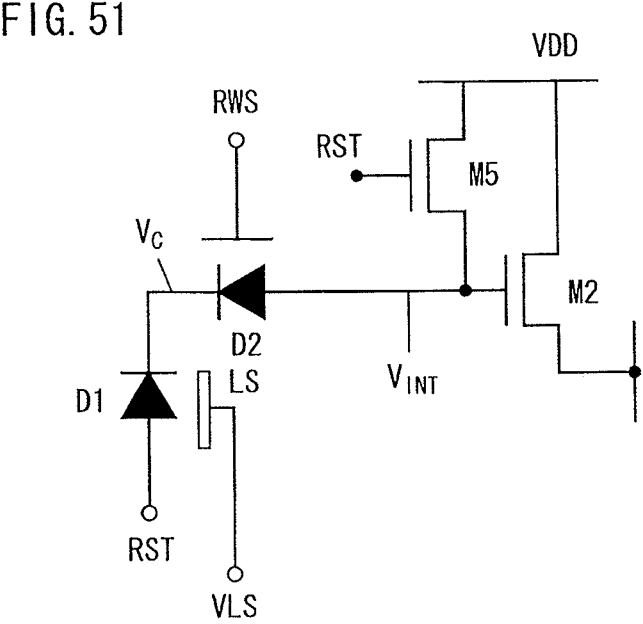
FIG. 51 is an equivalent circuit diagram of an optical sensor according to a second exemplary modification of Embodiment 6.
Figure 52:
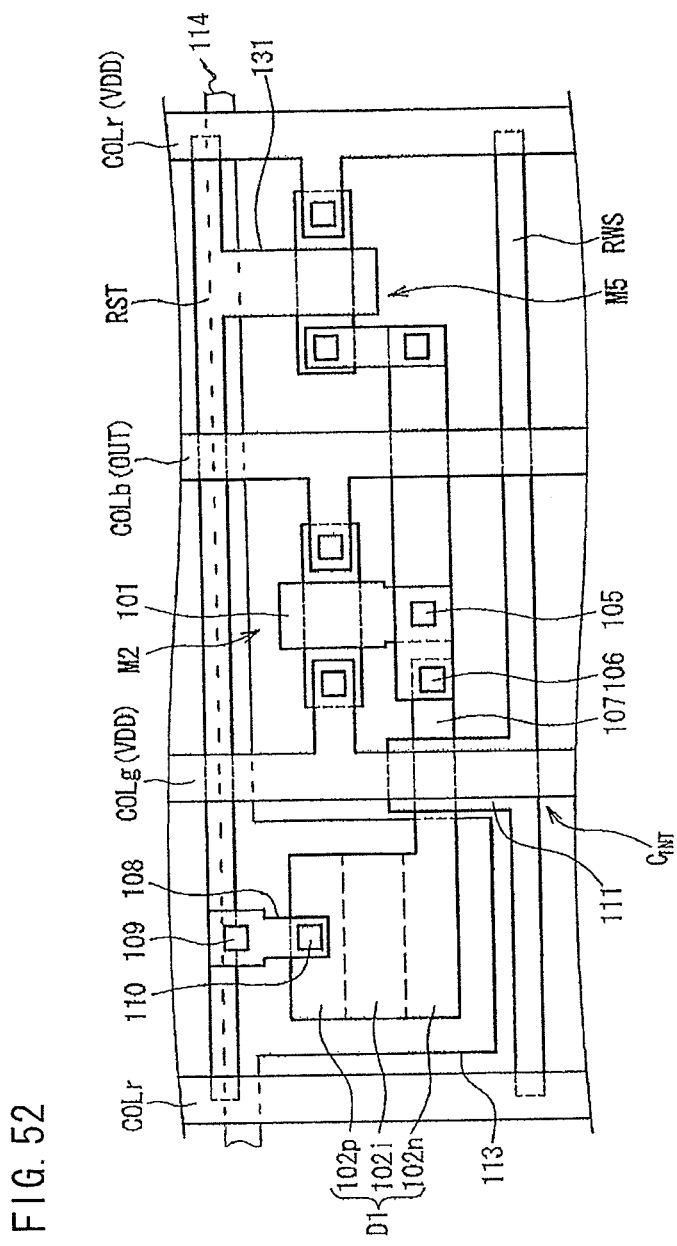
FIG. 52 is a plan view showing an exemplary planar structure of the optical sensor according to the second exemplary modification of Embodiment 6.

Further, as the second exemplary modification, a configuration as shown in FIGS. 51 and 52 may be used. FIG. 51 is an equivalent circuit diagram of an optical sensor according to the second exemplary modification of the present embodiment. FIG. 52 is a plan view showing an exemplary planar structure of the optical sensor according to the second exemplary modification of the present embodiment. The configuration shown in FIGS. 51 and 52 differs from the above-described first exemplary modification in that the anode (p-type semiconductor region 102p) of the diode D1 is connected to the line RST for supplying the reset signal. In the case of this configuration, it is unnecessary to provide a line VSS separately. Therefore, this configuration has an advantage that the layout area of the optical sensor can be reduced, as compared with the above-described first exemplary modification.

Further, with the optical sensor of the present embodiment also, an optical sensor output having excellent linearity with respect to illuminance variation can be obtained, as is the case with Embodiment 1, by fixing the potential of the light shielding film LS of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 7 of the present invention is explained. The members having the same functions as those of the embodiments explained above are denoted by the same reference numerals as those in the above-described embodiments, and detailed explanations of the same are omitted.

Figure 53:
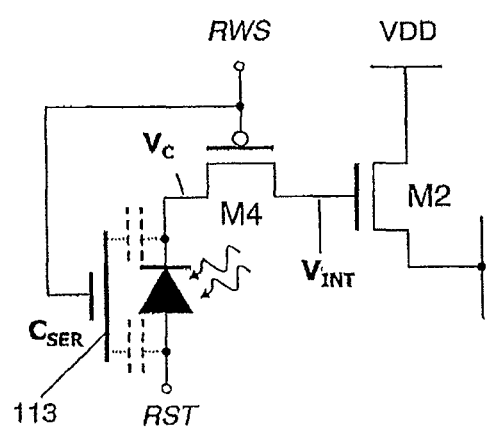
FIG. 53 is an equivalent circuit diagram of an optical sensor according to Embodiment 7.
Figure 54:
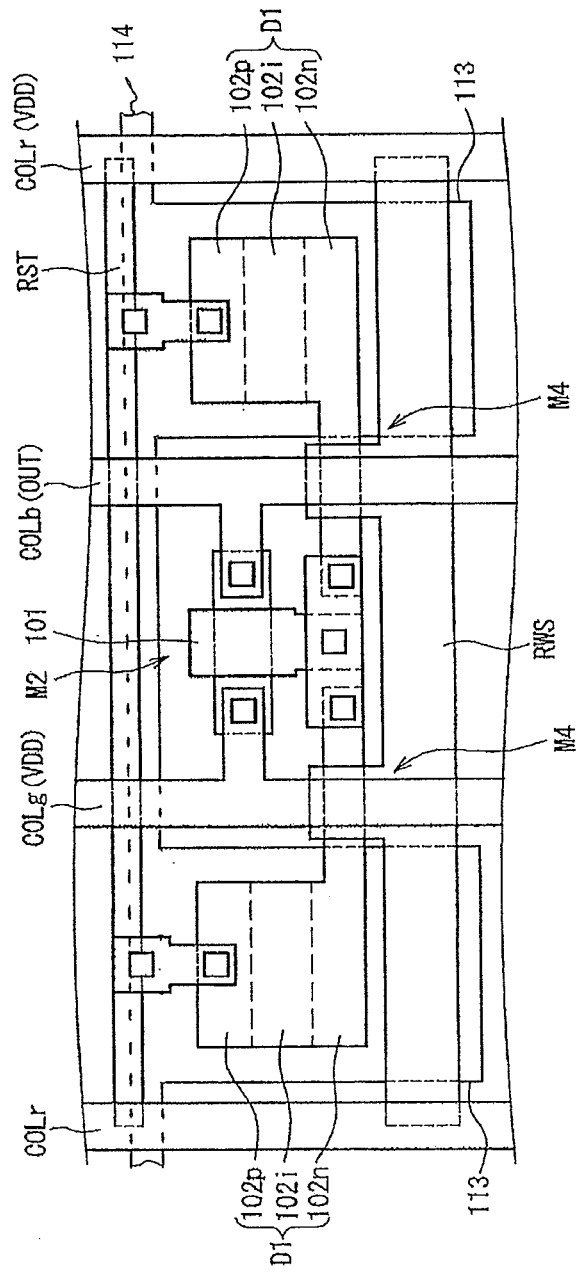
FIG. 54 is a plan view showing an exemplary planar structure of the optical sensor according to the present embodiment.

FIG. 53 is an equivalent circuit diagram of an optical sensor according to the present embodiment. FIG. 54 is a plan view showing an exemplary planar structure of an optical sensor according to the present embodiment.

The optical sensor according to the present embodiment has a configuration obtained by modifying the configuration of Embodiment 4 shown in FIGS. 33 to 35 so that the metal film 113 as the light shielding film LS provided on a back side of the diode D1 is extended to a position opposed to the line RWS, and a capacitor $C_{SER}$ is formed by this metal film 113, the line RWS, and an insulation film (not shown) provided therebetween, as shown in FIGS. 53 and 54. In other words, the optical sensor according to the present embodiment employs a p-channel TFT (transistor M4) as an amplifying element, as is the case with Embodiment 4.

In the configuration shown in FIG. 53, the capacitor $C_{SER}$ functions as a serial capacitor with respect to capacitances Cc and Ca between the metal film 113 and the diode D1. Therefore, it is possible to increase only $C_{INT}$, without increasing $C_{INT}'$ in the formula (6) in Embodiment 1 explained above, and hence, to improve the amplification effect upon readout.

It should be noted that, as the capacitor $C_{SER}$ is provided in this way, the configuration employing the p-channel TFT as an amplifying element as in the present embodiment is more remarkably effective in improving the amplification effect upon readout, as compared with the configuration employing a variable capacitor as an amplifying element.

Figure 55A:
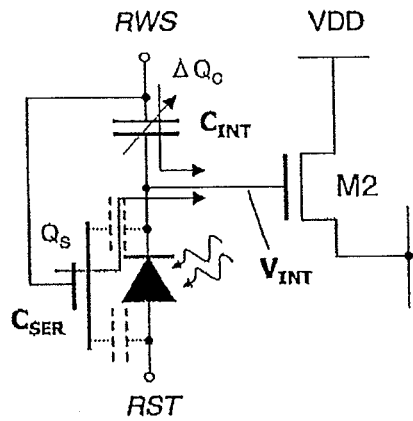
FIG. 55A is a circuit diagram showing a state of charge injection in the case where a serial capacitor $C_{SER}$ is combined with a configuration in which an amplifying element is a variable capacitor.

More specifically, in the case where the capacitor $C_{SER}$ is combined with a configuration in which the variable capacitor C1 is used as an amplifying element (Embodiment 1) as shown in FIG. 55A, the potential $V_{INT}$ of the accumulation node upon readout is influenced, not only by charges $\Delta Q_C$ from the capacitor C1, but also by charges Qs injected from the capacitor $C_{SER}$. Therefore, in this configuration, the capacitor $C_{SER}$ ends up decreasing the amplification effect upon readout.

Figure 55B:
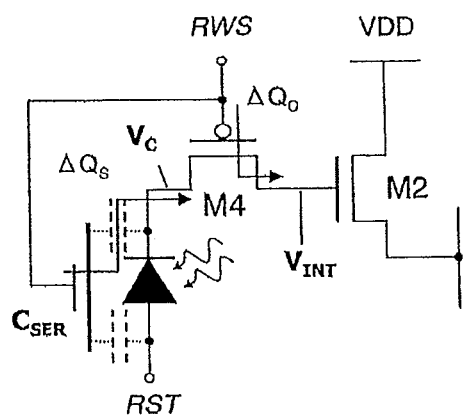
FIG. 55B is a circuit diagram showing a state of charge injection in the case where a serial capacitor $C_{SER}$ is combined with a configuration in which an amplifying element is a p-channel TFT.

On the other hand, as shown in FIG. 55B, in the case where the capacitor $C_{SER}$ is combined with the configuration in which the p-channel TFT (transistor M4) is used as an amplifying element, as is the case with the present embodiment, charges injected from the capacitor $C_{SER}$ also have to pass through the transistor M4 upon readout. Therefore, charges ($\Delta Q_S$) injected from the capacitor $C_{SER}$ also, together with charges $\Delta Q_C$, work for improving the amplification effect.

Therefore, the optical sensor obtained by combining the capacitor $C_{SER}$ with the configuration in which the p-channel TFT is used as amplifying element, like in the present embodiment, is effective for obtaining an excellent amplification effect.

It should be noted that the above explanation refers to an example obtained by combining the capacitor $C_{SER}$ with the configuration of Embodiment 4 shown in FIGS. 33 to 35, but the same effect can be achieved by combining the capacitor $C_{SER}$ with any of the other configurations explained in the descriptions of Embodiments 4 and 5.

Hereinafter, Embodiment 8 of the present invention is explained. The members having the same functions as those of the above-described embodiments are denoted by the same reference numerals as those in the above-described embodiments, and detailed explanations of the same are omitted.

Figure 56:
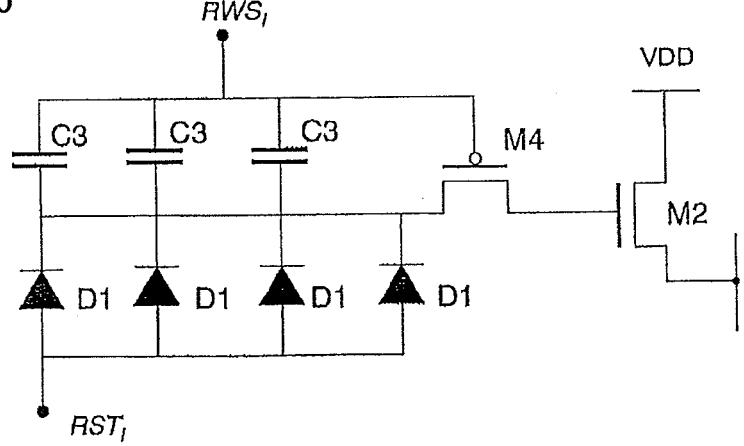
FIG. 56 is an equivalent circuit diagram of an optical sensor according to Embodiment 8.
Figure 57:
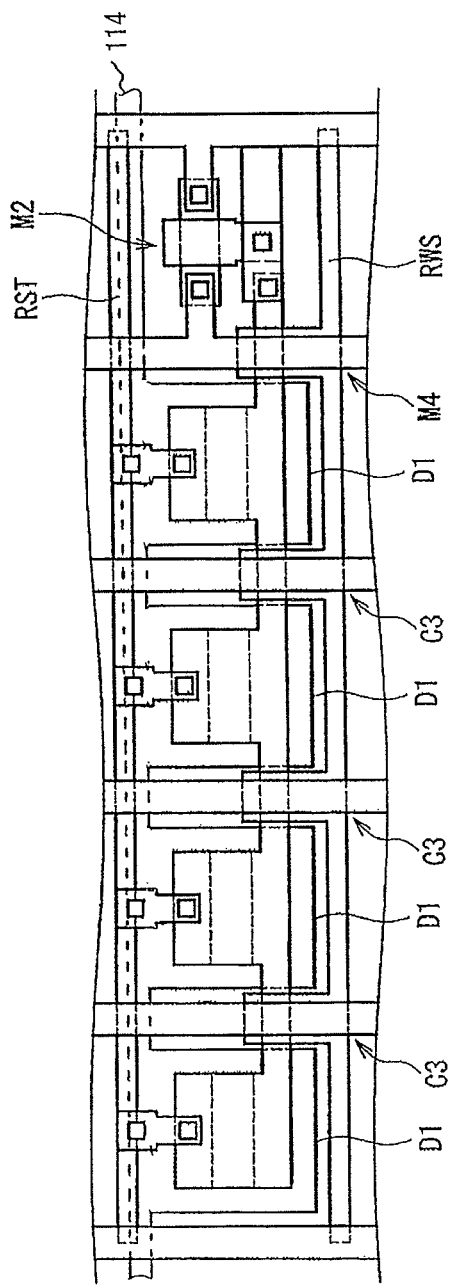
FIG. 57 is a plan view showing an exemplary planar structure of an optical sensor according to Embodiment 8.

FIG. 56 is an equivalent circuit diagram of an optical sensor according to the present embodiment. FIG. 57 is a plan view showing an exemplary planar structure of an optical sensor according to the present embodiment. As shown in FIGS. 56 and 57, in the optical sensor according to the present embodiment, diodes D1 and capacitors C3 are arrayed in parallel over a plurality of pixel areas. The capacitor C3 is a usual (non-variable) capacitor. It should be noted that the example shown in FIGS. 56 and 57 has a configuration in which readout is carried out from four diodes D1 by one readout transistor M2, but the number of the diodes D1 subjected to readout is not limited to this.

In the example shown in FIGS. 56 and 57, a p-channel TFT (transistor M4) is formed as an amplifying element in the pixel area closest to the readout transistor M2, and the usual (non-variable) capacitor C3 is formed in each of the other pixel areas.

With this configuration, in which a plurality of the diodes D1 are connected in parallel, a photoelectric current can be increased. Further, as the amplifying element is provided at the diode D1 closest to the readout transistor M2 among the plurality of the diodes D1, the potential of the accumulation node can be read out in an amplified state. Thus, an optical sensor having high sensitivity can be realized, without degradation of the S/N ratio. Besides, by using the p-channel TFT is used as an amplifying element, the boundary length can be shortened as compared with the case where a variable capacitor is used, as described above. This makes it possible to improve the amplification effect further.

Further, with the optical sensor of the present embodiment as well, an optical sensor output having excellent linearity with respect to illuminance variation can be obtained, as is the case with Embodiment 1, by fixing the potential of the light shielding film LS (not shown) of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 9 of the present invention is explained. The members having the same functions as those of the embodiments explained above are denoted by the same reference numerals as those in the above-described embodiments, and detailed explanations of the same are omitted.

Figure 58:
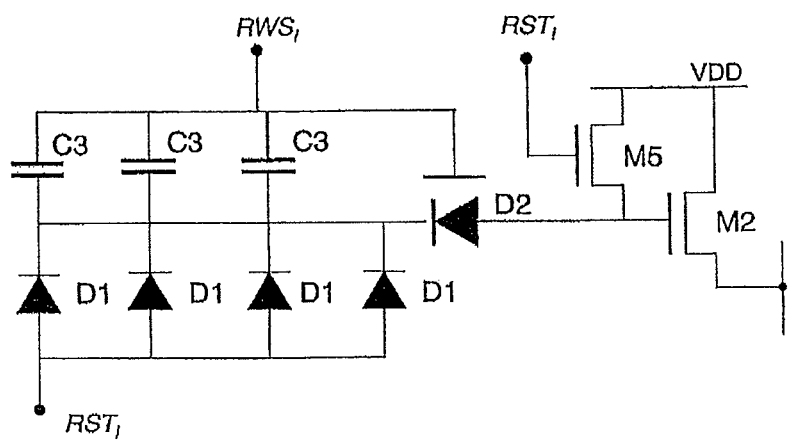
FIG. 58 is an equivalent circuit diagram of an optical sensor according to Embodiment 9.
Figure 59:
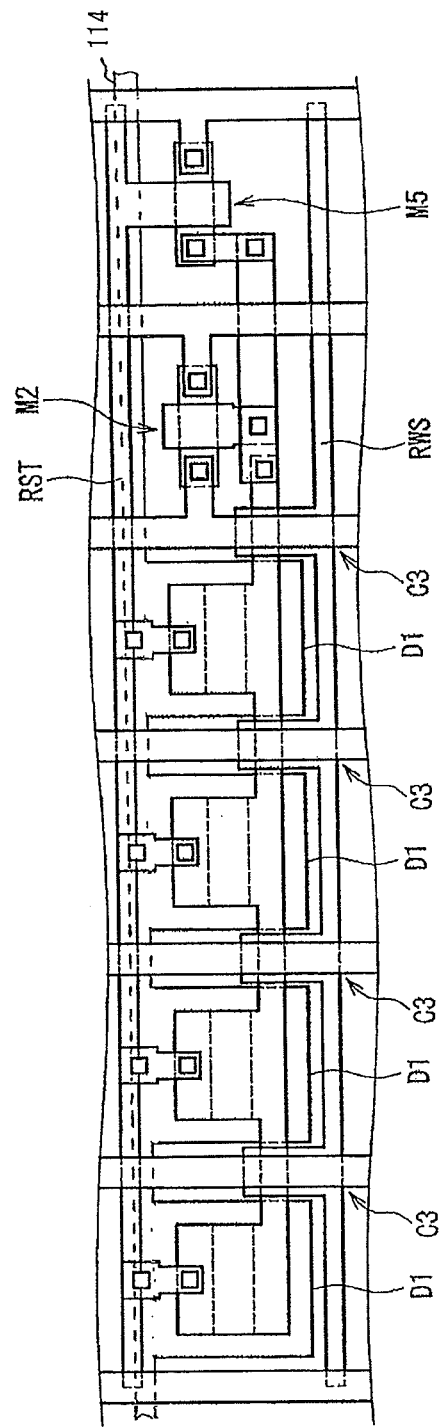
FIG. 59 is a plan view showing an exemplary planar structure of the optical sensor according to Embodiment 9.

FIG. 58 is an equivalent circuit diagram of an optical sensor according to the present embodiment. FIG. 59 is a plan view showing an exemplary planar structure of the optical sensor according to the present embodiment. As shown in FIGS. 58 and 59, in the optical sensor according to the present embodiment, diodes D1 and capacitors C3 are arrayed in parallel over a plurality of pixel areas. The capacitor C3 is a usual (non-variable) capacitor. It should be noted that the example shown in FIGS. 58 and 59 has a configuration in which readout is carried out from four diodes D1 by one readout transistor M2, but the number of the diodes D1 subjected to readout is not limited to this.

In the example show in FIGS. 58 and 59, a diode D2 as an amplifying element is provided in the pixel area closest to the readout transistor M2 among the four diodes D1, and the usual (non-variable) capacitor C3 is formed in each of the other pixel areas. Besides, a transistor M5 for resetting is formed in a pixel area adjacent to the readout transistor M2.

With this configuration, in which a plurality of the diodes D1 are connected in parallel, a photoelectric current can be increased. Further, as the amplifying element (diode D2) is provided at the diode D1 closest to the readout transistor M2 among the plurality of the diodes D1, the potential of the accumulation node can be read out in an amplified state. Thus, an optical sensor having high sensitivity can be realized, without degradation of the S/N ratio. Besides, by using the diode D2 is used as an amplifying element, the boundary length can be shortened as compared with the case where a variable capacitor is used, as described above. This makes it possible to improve the amplification effect further.

Further, with the optical sensor according to the present embodiment as well, an optical sensor output having excellent linearity with respect to illuminance variation can be obtained, as is the case with Embodiment 1, by fixing the potential of the light shielding film LS (not shown) of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Hereinafter, Embodiment 10 of the present invention is explained. The members having the same functions as those of the embodiments explained above are denoted by the same reference numerals as those in the above-described embodiments, and detailed explanations of the same are omitted.

Figure 60:
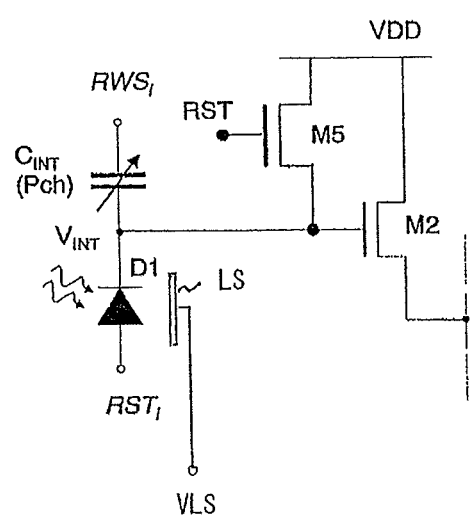
FIG. 60 is an equivalent circuit diagram of the optical sensor according to the present embodiment.
Figure 61:
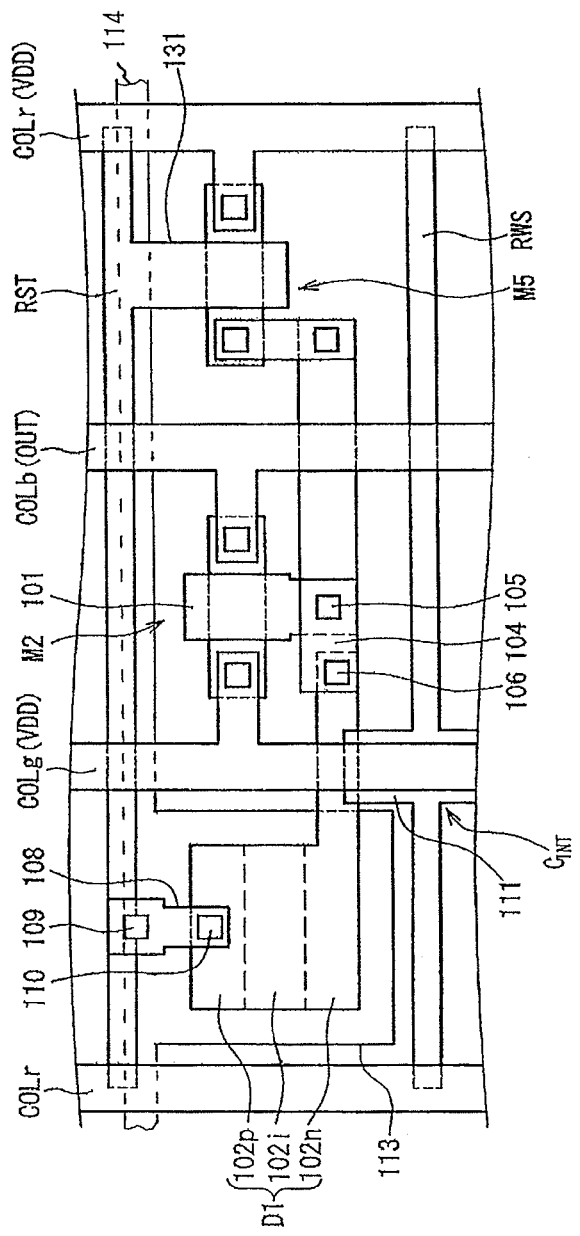
FIG. 61 is a plan view showing an exemplary planar structure of the optical sensor according to the present embodiment.
Figure 62:
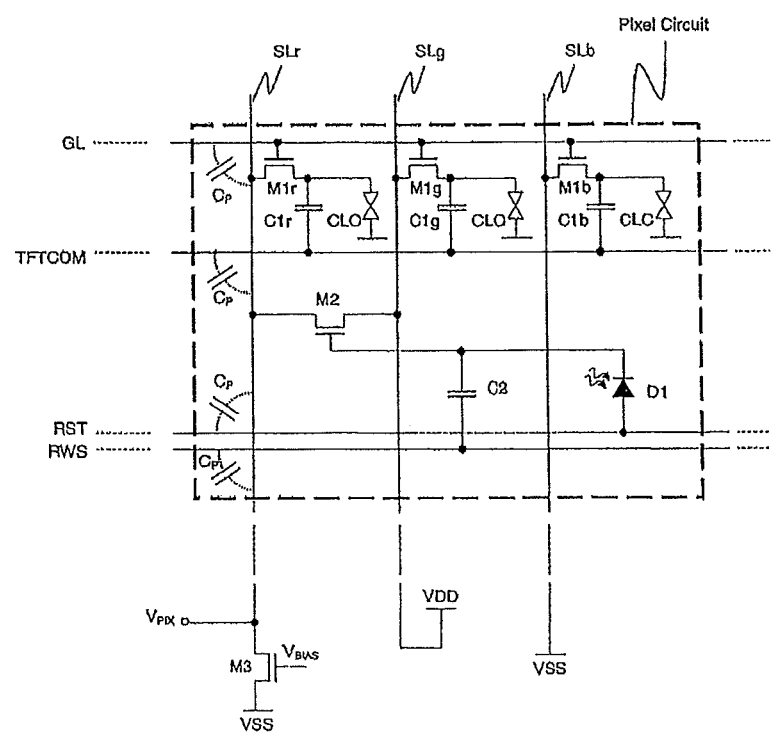
FIG. 62 is an equivalent circuit diagram showing an exemplary conventional optical sensor formed on an active matrix substrate.

FIG. 60 is an equivalent circuit diagram of the optical sensor according to the present embodiment. FIG. 61 is a plan view showing an exemplary planar structure of the optical sensor according to the present embodiment. The optical sensor according to the present embodiment has a configuration obtained by adding a reset transistor M5 to the optical sensor according to Embodiment 1, as shown in FIGS. 60 and 61. A gate electrode 131 of the reset transistor M5 is extended from the line RST.

With this configuration as well, as is the case with the optical sensor according to Embodiment 1, a potential of the accumulation node can be read out in an amplified state. Thus, an optical sensor having high sensitivity can be realized, without degradation of the S/N ratio.

Further, with the optical sensor according to the present embodiment as well, an optical sensor output having excellent linearity with respect to illuminance variation can be obtained, as is the case with Embodiment 1, by fixing the potential of the light shielding film LS of the diode D1 to the constant potential $V_{LS}$, and setting the constant potential $V_{LS}$ to a value that satisfies:

$$V_{LS} \geq V_{RST.H}$$

or preferably, $$V_{LS} \geq V_{RST.H} + V_{th\_p}$$

Still further, this configuration in which the reset transistor M5 is provided is applicable, not only to Embodiment 1, but also to Embodiments 2, 3, 4, 5, 7, and 8, and the effect as described above can be achieved in each embodiment.

So far Embodiments 1 to 10 of the present invention have been explained, but the present invention is not limited to the above-described embodiments. The present invention can be varied within the scope of the invention.

For example, in the foregoing description of the embodiments, the configuration is shown in which the lines VDD, VSS, and OUT connected to the optical sensors double as the source lines COL. This configuration has an advantage of a high pixel aperture ratio. However, with this configuration, as the lines for the optical sensors double as the source lines COL, sensor circuit output data cannot be read out while video signals for image display are being applied to the source lines COL. Therefore, it is required to apply a readout signal for sensor circuit output data, during a flyback period, as shown in FIG. 14. Then, the lines VDD, VSS, and OUT for the optical sensors may be provided separately from the source lines COL. This configuration, though having a low pixel aperture ratio, allows the lines for the optical sensors to be driven separately from the source lines COL, and therefore has an advantage that sensor circuit output data can be read out, independently of timings of image display.

The present invention is industrially applicable as a display device having optical sensors in a pixel region of an active matrix substrate.

The invention claimed is:

1. A display device comprising an optical sensor in a pixel region on an active matrix substrate, wherein the optical sensor includes:

a photodetecting element for receiving incident light;

a reset signal line for supplying a reset signal to the optical sensor;

a readout signal line for supplying a readout signal to the optical sensor;

an accumulation node having a potential that varies with an amount of light received by the photodetecting element during a sensing period, the sensing period being a period from supply of the reset signal to supply of the readout signal;

an amplifying element for amplifying the potential of the accumulation node according to the readout signal; and a sensor switching element for reading out the potential amplified by the amplifying element and outputting the potential as a sensor circuit output to an output line, wherein a light shielding film is provided on a side opposite to a light receiving surface side with respect to the photodetecting element, the light shielding film is connected to a power source for supplying a voltage for fixing a potential of the light shielding film to a constant potential, and the following formula is satisfied:

$$V_{LS} \geq V_{RST.H}$$

where $V_{LS}$ represents the constant potential and $V_{RST.H}$ represents a high level potential of the reset signal.

2. The display device according to claim 1, wherein the photodetecting element is a PIN diode, and the following formula is satisfied:

$$V_{LS} \geq V_{RST.H} + V_{th\_p}$$

where $V_{th\_p}$, represents a p-channel threshold voltage of the PIN diode.

3. The display device according to claim 1, wherein the amplifying element is a variable capacitor.

4. The display device according to claim 3, wherein the variable capacitor is a MOS capacitor that includes the readout signal line, an insulation film, and a p-type semiconductor region formed in a silicon film.

5. The display device according to claim 3, wherein the variable capacitor is a MOS capacitor that includes a gate electrode of the sensor switching element, an insulation film, and an n-type semiconductor region formed in a silicon film.

6. The display device according to claim 1, wherein the amplifying element is a p-channel thin film transistor.

7. The display device according to claim 6, wherein in the p-channel thin film transistor, a channel region is formed in a wide portion of a silicon film that connects the photodetecting element and the accumulation node with each other, and a gate electrode of the p-channel thin film transistor is provided so as to overlap the wide portion.

8. The display device according to claim 1, wherein the amplifying element is an n-channel thin film transistor.

9. The display device according to claim 1, wherein the amplifying element is a diode having a gate electrode on a channel.

10. The display device according to claim 1, wherein an electrode is provided that is opposed to the light shielding film so as to form a serial capacitance with respect to a parasitic capacitance between the light shielding film and the photodetecting element, and the electrode is connected electrically with the readout signal line.

11. The display device according to claim 1, wherein a plurality of the photodetecting elements are provided in the pixel region, the plurality of photodetecting elements are connected in parallel, and the amplifying element is connected to one of the photodetecting elements positioned at an end of the photodetecting elements.

12. The display device according to claim 1, wherein the sensor switching element is a three-terminal switching element, a gate electrode among the three terminals is connected to the accumulation node, and one of the other two terminals among the three terminals is connected to the output line.

13. The display device according to claim 1, wherein a switching element for resetting the sensor switching element is further provided.

14. The display device according to claim 1, wherein the amplifying element has a threshold potential at which a state of the amplifying element is switched between ON and OFF, in a range between a low level potential and a high level potential of the readout signal.

15. The display device according to claim 1, further comprising:

a counter substrate opposed to the active matrix substrate; and liquid crystal interposed between the active matrix substrate and the counter substrate.

16. A display device comprising an optical sensor in a pixel region on an active matrix substrate, wherein the optical sensor includes:

a photodetecting element for receiving incident light;

a reset signal line for supplying a reset signal to the optical sensor;

a readout signal line for supplying a readout signal to the optical sensor;

an accumulation node having a potential that varies with an amount of light received by the photodetecting element during a sensing period, the sensing period being a period from supply of the reset signal to supply of the readout signal;

an amplifying element for amplifying the potential of the accumulation node according to the readout signal; and a sensor switching element for reading out the potential amplified by the amplifying element and outputting the potential as a sensor circuit output to an output line, wherein a light shielding film is provided on a side opposite to a light receiving surface side with respect to the photodetecting element, and the light shielding film is connected to a power source for supplying a voltage for fixing a potential of the light shielding film to a constant potential.

17. The display device according to claim 16, wherein the photodetecting element is a PIN diode.

* * * * *